United States Patent
Bai et al.

(10) Patent No.: US 12,149,135 B2
(45) Date of Patent: Nov. 19, 2024

(54) ELECTRIC MOTOR STATOR AND ELECTRIC MOTOR

(71) Applicant: BorgWarner PowerDrive Systems(Tianjin)Co., Ltd., Tianjin (CN)

(72) Inventors: Rongjian Bai, Tianjin (CN); Yanhai Liu, Tianjin (CN)

(73) Assignee: BorgWarner PowerDrive Systems (Tianjin) Co., Ltd., Tianjin (CN)

( * ) Notice: Subject to any disclaimer, the term of this patent is extended or adjusted under 35 U.S.C. 154(b) by 189 days.

(21) Appl. No.: 17/635,387

(22) PCT Filed: Jan. 13, 2021

(86) PCT No.: PCT/CN2021/071594
§ 371 (c)(1),
(2) Date: Feb. 15, 2022

(87) PCT Pub. No.: WO2021/143740
PCT Pub. Date: Jul. 22, 2021

(65) Prior Publication Data
US 2023/0318380 A1    Oct. 5, 2023

(30) Foreign Application Priority Data
Jan. 14, 2020    (CN) .......................... 202010034942.7

(51) Int. Cl.
*H02K 3/28*    (2006.01)
*H02K 1/16*    (2006.01)
*H02K 3/12*    (2006.01)

(52) U.S. Cl.
CPC .............. *H02K 3/28* (2013.01); *H02K 1/165* (2013.01); *H02K 3/12* (2013.01)

(58) Field of Classification Search
CPC ............ H02K 3/28; H02K 3/12; H02K 1/165; H02K 2213/03
(Continued)

(56) References Cited

U.S. PATENT DOCUMENTS

| | | | | |
|---|---|---|---|---|
| 6,326,715 | B1* | 12/2001 | Asao | H02K 3/12 310/71 |
| 9,748,811 | B2* | 8/2017 | Asano | H02K 3/12 |
| 9,847,685 | B2* | 12/2017 | Nakagawa | H02K 3/12 |

FOREIGN PATENT DOCUMENTS

| | | |
|---|---|---|
| CN | 209526581 U | 10/2019 |
| CN | 110417151 A | 11/2019 |

(Continued)

OTHER PUBLICATIONS

Translation of foreign document CN 209526581 U (Year: 2019).*

*Primary Examiner* — Alex W Mok
(74) *Attorney, Agent, or Firm* — Samson G. Yu

(57) ABSTRACT

The present disclosure discloses an electric motor stator and an electric motor. The electric motor stator comprises: a stator core, the stator core being provided with a plurality of stator core slots, the plurality of stator core slots being formed on a radial inner surface of the stator core and being separated by a preset slot distance along a circumferential direction of the stator core; a stator winding, the stator winding being mounted on the stator core, the stator winding being provided with Q pole pair coils, wherein Q/a number of slots per pole per phase=P, P being an integer; wherein the stator winding being a three-phase winding, the number of slots per pole per phase being 3; the stator winding comprising: a first coil set and a third coil set successively sleeved from outside to inside.

13 Claims, 16 Drawing Sheets

(58) Field of Classification Search
USPC .......................................................... 310/208
See application file for complete search history.

(56) References Cited

FOREIGN PATENT DOCUMENTS

| | | |
|---|---|---|
| CN | 111181263 A | 5/2020 |
| WO | 2019231002 A1 | 12/2019 |

\* cited by examiner

ELECTRIC MOTOR STATOR AND ELECTRIC MOTOR

CROSS-REFERENCE TO RELATED APPLICATION

The present disclosure claims priority to patent application No. 202010034942.7, filed to the China National Intellectual Property Administration on Jan. 14, 2020 and entitled "Electric Motor Stator and Electric Motor".

TECHNICAL FIELD

The present disclosure relates to a technical field of electric motors, and in particular, to an electric motor stator and an electric motor.

BACKGROUND

A stator winding includes a plurality of hair-pin coils. According to a certain arrangement manner, the plurality of hair-pin coils are penetrated into slots of a stator core, so as to form the winding required for a single-phase electric motor or a polyphase electric motor. There are many types of hair-pin coils used in the prior art, and the arrangement is complicated. A large number of bus strips and bus bars are required to connect terminals and neutral points of the branches of each phase winding, resulting in a complicated manufacturing technique, a high production cost, and, a low processing efficiency.

SUMMARY

Embodiments of the present disclosure provide an electric motor stator and an electric motor. Due to few types of coil unit and a simple arrangement mode, the use of the bus strips and the bus bars are reduced, so that the terminals and the neutral points of the branches of each phase winding can be disposed in any slot and any layer, thereby lowering a degree of complexity of the manufacturing technique, reducing the production cost and increasing the processing efficiency.

An embodiment of the present disclosure provides an electric motor stator. The electric motor stator includes a stator core and a stator winding. The stator core is provided with a plurality of stator core slots. The plurality of <stator core slots are formed on a radial inner surface of the stator core and are separated by a preset slot distance in a circumferential direction of the stator core. The stator winding is mounted on the stator core and is provided with Q pole pair coils, wherein Q/a number of slots per pole per phase=P, and P is an integer. The stator winding is a three-phase winding, and the number of slots per pole per phase is 3. The stator winding includes a first coil set and a third coil set that are successively sleeved from outside to inside. The first coil set includes a plurality of first segmented coil units, and any one of the plurality of first segmented coil units is provided with two hair-pin coils with different pitches. The plurality of first segmented coil units of the first coil set are successively arranged at a same layer in the stator core slots in the circumferential direction of the stator core. The third coil set includes a plurality of third segmented coil units, and any one of the plurality of third segmented coil units is provided with hair-pin coils with a same pitch. The plurality of third segmented coil units of the third coil set are successively arranged at a same layer in the stator core slots in the circumferential direction of the stator core. The pitches of the hair-pin coils in each first segmented coil unit are different from the pitches of the hair-pin coils in each third segmented coil unit.

Further, the stator winding further includes a second coil set disposed between the first coil set and the third coil set. The second coil set includes a plurality of second segmented coil units, and any one of the plurality of second segmented coil unit Is provided with two hair-pin coils with different pitches, or, any one of the plurality of second segmented coil unit is provided with hair-pin coils with a same pitch. The plurality of second segmented coil units of the second coil set are successively arranged at adjacent two layers in the stator core slots in the circumferential direction of the stator core.

Further, the pitches of the hair-pin coils of each second segmented coil unit are the same as the pitches of the hair-pin coils of each first segmented coil unit.

Further, the pitches of the hair-pin coils of each second segmented coil unit are the same as the pitches of the hair-pin coils of each third segmented coil unit.

Further, each first segmented coil unit includes at least one long-pitch hair-pin coil or at least one short-pitch hair-pin coil.

Further, each third segmented coil unit includes a hair-pin coil with a diameter pitch.

Further, each first segmented coil unit includes one long-pitch hair-pin coil and two short-pitch hair-pin coils, or, each first segmented coil unit includes two long-pitch hair-pin coils and one short-pitch hair-pin coil.

Further, each hair-pin coil of each segmented coil unit in each coil set of the stator winding includes a first slot outer end portion, a first slot inner portion, a first slot outer turning portion, a second slot inner portion, and a second slot outer end portion that are successively connected. The first slot inner portion and the second slot inner portion are located in different slots. The first slot outer turning portion of each hair-pin coil of each segmented coil unit in each coil set of the stator winding is located on a side of an end surface of the stator core, and the first slot outer end portion or the second slot outer end portion of each hair-pin coil of each segmented coil unit in each coil set of the stator winding is located on a side of the other end surface of the stator core.

Further, the first slot outer end portion and the second slot outer end portion of each hair-pin coil of each segmented coil unit of the first coil set have a same extending direction in the circumferential direction of the stator core. The first slot outer end portion and the second slot outer end portion of each hair-pin coil of each segmented coil unit of the third coil set have a same extending direction in the circumferential direction of the stator core. The first slot outer end portion of each hair-pin coil of each segmented coil unit of the first coil set and the first slot outer end portion of each hair-pin coil of each segmented coil unit of the third coil set have opposite extending directions in the circumferential direction of the stator core.

Further, a slot inner portion of each hair-pin coil of each segmented coil unit of the stator winding and a slot outer end portion connected with the slot inner portion and extended in the circumferential direction are located at a same layer of the stator core.

Further, each slot outer end portion of each hair-pin coil of each segmented coil unit in each coil set of the stator winding and a slot outer end portion radially adjacent to the each stator core extend in opposite directions in the circumferential direction of the stator core.

Further, the first slot outer end portion and the second slot outer end portion have extending ends. Except the extending ends connected with lead wires, an extending end of a N−1 layer and an extending end of a N layer in a same radial direction of the stator core are connected, the extending end of the N layer is adjacent to the extending end of the N−1 layer, wherein N is an even number.

An embodiment of the present disclosure further provides an electric motor. The electric motor includes a rotor and the above electric motor stator.

In the technical solution of the embodiments of the present disclosure, the electric motor stator includes the stator core and the stator winding. The stator core is provided with the plurality of stator core slots. The plurality of stator core slots are formed on the radial inner surface of the stator core and are separated by the preset slot distance in the circumferential direction of the stator core. The stator winding is mounted on the stator core and is provided with Q pole pair coils, wherein Q/the number of slots per pole per phase=P, and P is an integer. The stator winding is the three-phase winding, and the number of slots per pole per phase is 3. The stator winding includes the first coil set and the third coil set that are successively sleeved from outside to inside. The first coil set includes the plurality of first segmented coil units, and any one of the plurality of first segmented coil units is provided with two hair-pin coils with different pitches. The plurality of first segmented coil units of the first coil set are successively arranged at the same layer in the stator core slots in the circumferential direction of the stator core. The third coil set includes the plurality of third segmented coil units, and any one of the plurality of third segmented coil units is provided with the hair-pin coils with the same pitch. The plurality of third segmented coil units of the third coil set are successively arranged at the same layer in the stator core slots in the circumferential direction of the stator core. The pitches of the hair-pin coils in each first segmented coil unit are different from the pitches of the hair-pin coils in each third segmented coil unit. By adopting a single conductor to form an electric motor winding, bus bars among phases are canceled. The phases are directly connected, and the lead wire can be disposed at any slot and any layer. Therefore, a production cost is reduced, and processing efficiency is improved.

DETAILED DESCRIPTION OF THE EMBODIMENTS

Figure 1:
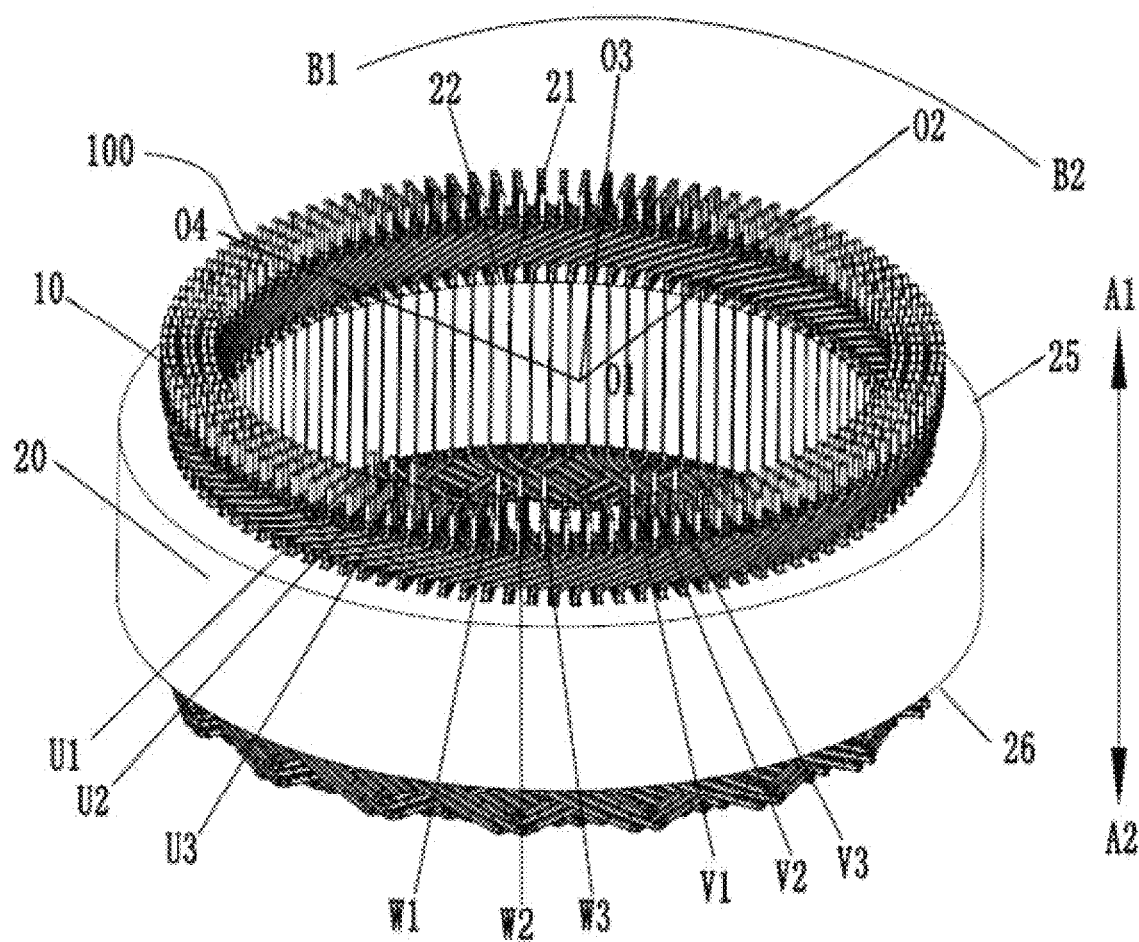
FIG. 1 is a schematic structural diagram of an electric motor stator according to an embodiment of the present disclosure.

The present disclosure is further described in detail below with reference to the drawings and embodiments. It should be understood that, the specific embodiments described here are merely used to explain the present disclosure, but do not to limit the present disclosure. In addition, it is to be noted that, for ease of description, only the parts related to the present disclosure are shown in the drawings, but not all of the structure.

The present disclosure provides an electric motor stator. In FIG. 1, FIG. 3, FIG. 5, FIG. 7, FIG. 9, and FIG. 13, an extending direction of A1A2 is parallel to an axial direction of a stator core. An extending direction of B1B2 is a circumferential direction of the stator core (that is, a peripheral direction of the stator core). O1O2, O1O3, and O1O4 are three extending directions exemplarily drawn along a radial direction of the stator core.

Figure 2:
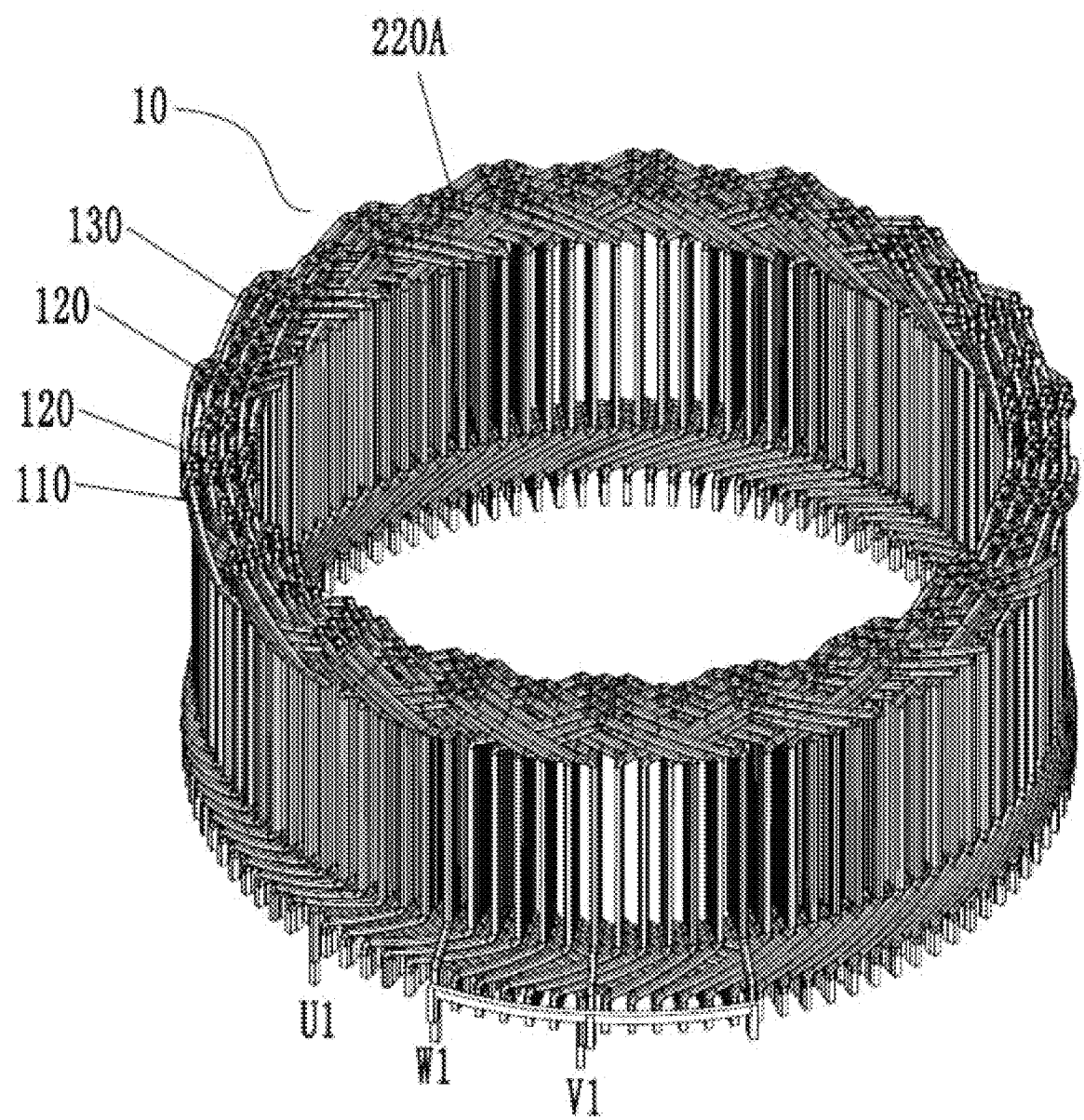
FIG. 2 is a schematic structural diagram of a stator winding of an electric motor stator according to an embodiment of the present disclosure.
Figure 3:
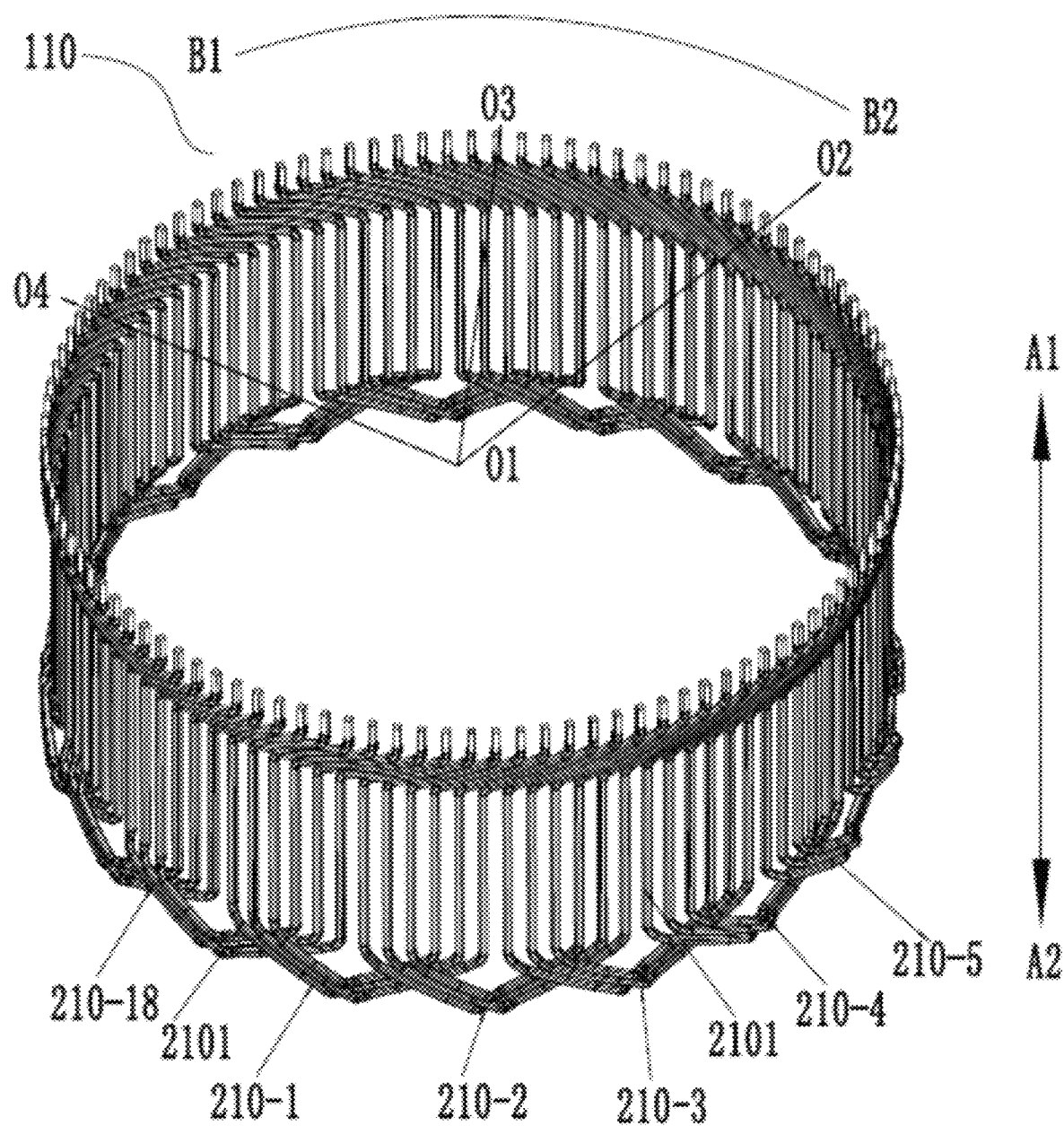
FIG. 3 is a schematic structural diagram of a first coil set of a stator winding of an electric motor stator according to an embodiment of the present disclosure.

As shown in FIG. 1 to FIG. 3, the electric motor stator 100 includes the stator core 20. The stator core 20 is provided with a plurality of stator core slots 21. The plurality of stator core slots 21 are formed on a radial inner surface of the stator core 20 and are separated by a preset slot distance in the circumferential direction of the stator core 20.

As shown in FIG. 1 and FIG. 2, the electric motor stator 100 further includes a stator winding 10. The stator winding 10 is mounted on the stator core 20. The stator winding 10 is provided with Q pole pair coils, where Q/a number of slots per pole per phase=P, and P is an integer. The stator winding 10 is a three-phase winding, and the number of slots per pole per phase is 3.

In this embodiment, the stator winding 10 is mounted on the stator core 20. The stator winding 10 is three-phase (that is, a U phase, V phase, and a W phase), and the number of slots per pole per phase is 3.

In this embodiment, each magnetic pole of a rotor corresponds to three stator core slots 21. The rotor is provided with twelve magnetic poles. The twelve magnetic poles of the rotor correspond to the Q pole pair coils of the stator winding 10 (in this embodiment, Q equals 6), wherein Q/the number of slots per pole per phase=P, and P is an integer; 6/3=2, P equals 2, which is an integer; and correspondingly, a quantity of the stator core slots 21 disposed in the stator core 20 equals 108 (that is, 3×12×3).

In addition, in this embodiment, the stator core 20 includes a tooth portion 22 defined by adjacent two stator core slots 21. Two end surfaces 25 and 26 in an axial direction of the stator core are formed on the stator core 20 by laminating a plurality of annular magnetic steel plates. A plurality of insulating papers are inserted in grooves of the magnetic steel plates (not shown in the figure). It is to be noted that, the magnetic steel plates may also be replaced by other conventional metal plates for use.

The stator winding 10 includes a first coil set 110 and a third coil set 130 that are successively sleeved from outside to inside. As shown in FIG. 2, in this embodiment, the first coil set 110 is disposed on a radial outer side of the stator core, that is, a direction away from the radial inner surface of the stator core. The third coil set 130 is disposed on a radial inner side of the stator core, that is, a direction close to the radial inner surface of the stator core.

Correspondingly, in some embodiments, the coil sets (including the third coil set 130 and the first coil set 110) in the stator winding 10 are successively sleeved from outside to inside. The first coil set 110 is disposed on a radial inner side of the stator core, that is, a direction close to the radial inner surface of the stator core. The third coil set 130 is disposed on a radial outer side of the stator core, that is, a direction away from the radial inner surface of the stator core.

Figure 4:
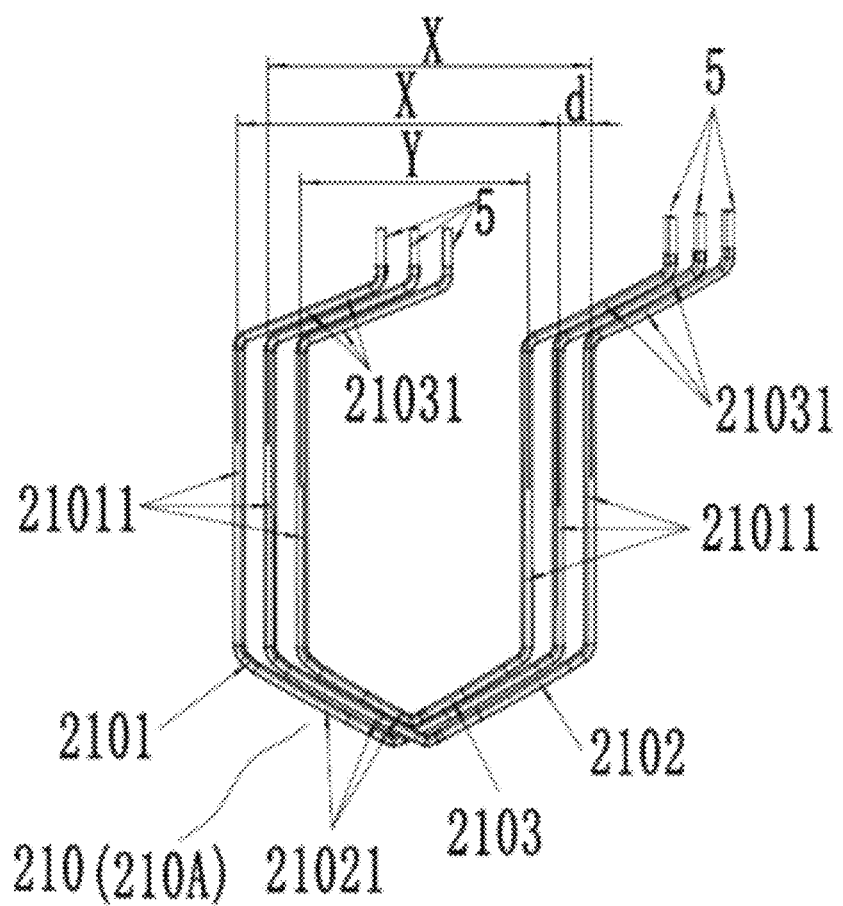
FIG. 4 is a schematic structural diagram of a first segmented coil unit of a first coil set of a stator winding of an electric motor stator according to an embodiment of the present disclosure.

As shown in FIG. 3 and FIG. 4, the first coil set 110 includes a plurality of first segmented coil units 210. Any one of the plurality of first segmented coil unit 210 is provided with two hair-pin coils with different pitches.

In this embodiment, the first coil set 110 includes 18 first segmented coil units 210. Any first segmented coil unit 210 is provided with three hair-pin coils, that is, a first hair-pin coil 2101, a second hair-pin coil 2102, and a third hair-pin coil 2103. A slot pitch between two slot inner portions 21011 of the first hair-pin coil 2101 is X, a slot pitch between two slot inner portions 21011 of the second hair-pin coil 2102 is X, and a slot pitch between two slot inner portions 21011 of the third hair-pin coil 2103 is Y (in this embodiment, the slot pitch X is 10, and the slot pitch Y is 7). That is to say, the first segmented coil unit 210 is provided with two hair-pin coils with different pitches. In this embodiment, a pitch of the first hair-pin coil 2101 is same as a pitch of the second hair-pin coil 2102, and a pitch of the third hair-pin coil 2103 is different from that of the first hair-pin coil 2101 and the second hair-pin coil 2102.

The plurality of first segmented coil units 210 of the first coil set 110 are successively arranged at a same layer in the stator core slots 21 in the circumferential direction of the stator core.

In this embodiment, the 18 first segmented coil units 210 of the first coil set 110 are successively arranged at the same layer in the stator core slots 21 in the circumferential direction of the stator core. Specifically, the slot inner portions 21011 of the three hair-pin coils in the first segmented coil unit 210 are located at a same radial layer in different slots of the stator core. As shown in FIG. 4, a first slot inner portion 21011 (that is, the slot inner portion on a left side) of the first hair-pin coil 2101 is located at a first layer in a first slot of the stator core 20, a first slot inner portion 21011 (that is, the slot inner portion on the left side) of the second hair-pin coil 2102 is located at a first layer in a second slot of the stator core 20, a first slot inner portion 21011 (that is, the slot inner portion on the left side) of the third hair-pin coil 2103 is located at a first layer in a third slot of the stator core 20, a second slot inner portion 21011 (that is, the slot inner portion on a right side) of the first hair-pin coil 2101 is located at a first layer in an eleventh slot of the stator core 20, a second slot inner portion 21011 (that is, the slot inner portion on the right side) of the second hair-pin coil 2102 is located at a first layer in a twelfth slot of the stator core 20, and a second slot inner portion 21011 (that is, the slot inner portion on the right side) of the third hair-pin coil 2103 is located at a first layer in a tenth slot of the stator core 20. As shown in FIG. 3, the 18 first segmented coil units 210 of the first coil set 110 are successively arranged at the same radial layer in the 108 stator core slots of the stator core 20 in the circumferential direction of the stator core. In some embodiments, a slot pitch between the first slot inner portion of the first hair-pin coil 2101 of one first segmented coil unit 210-1 and the first slot inner portion of the first hair-pin coil 2101 of the other first segmented coil unit 210-4 is 18, the first segmented coil unit 210-1 and the first segmented coil unit 210-4 are adjacent and same in phase. In some embodiments, the first slot inner portion 21011 of the first hair-pin coil 2101 of the first segmented coil unit 210-1 is located in the first slot of the stator core 20, and the first slot inner portion 21011 of the first hair-pin coil 2101 of the other first segmented coil unit 210-4 is located in a nineteenth slot of the stator core 20. Correspondingly, a V-phase first coil set 110, a W-phase first coil set 110, and a U-phase first coil set 110 are correspondingly and successively moved 3 or 6 slots in the circumferential direction of the stator core. In this embodiment, the first coil set 110 is disposed on an outer side of the stator core 20, that is, a layer away from a direction of the radial inner surface of the stator core is the first layer. In some embodiments, the first coil set 110 is disposed on an inner side of the stator core 20, that is, a layer close to a direction of the radial inner surface of the stator core is the first layer.

Figure 5:
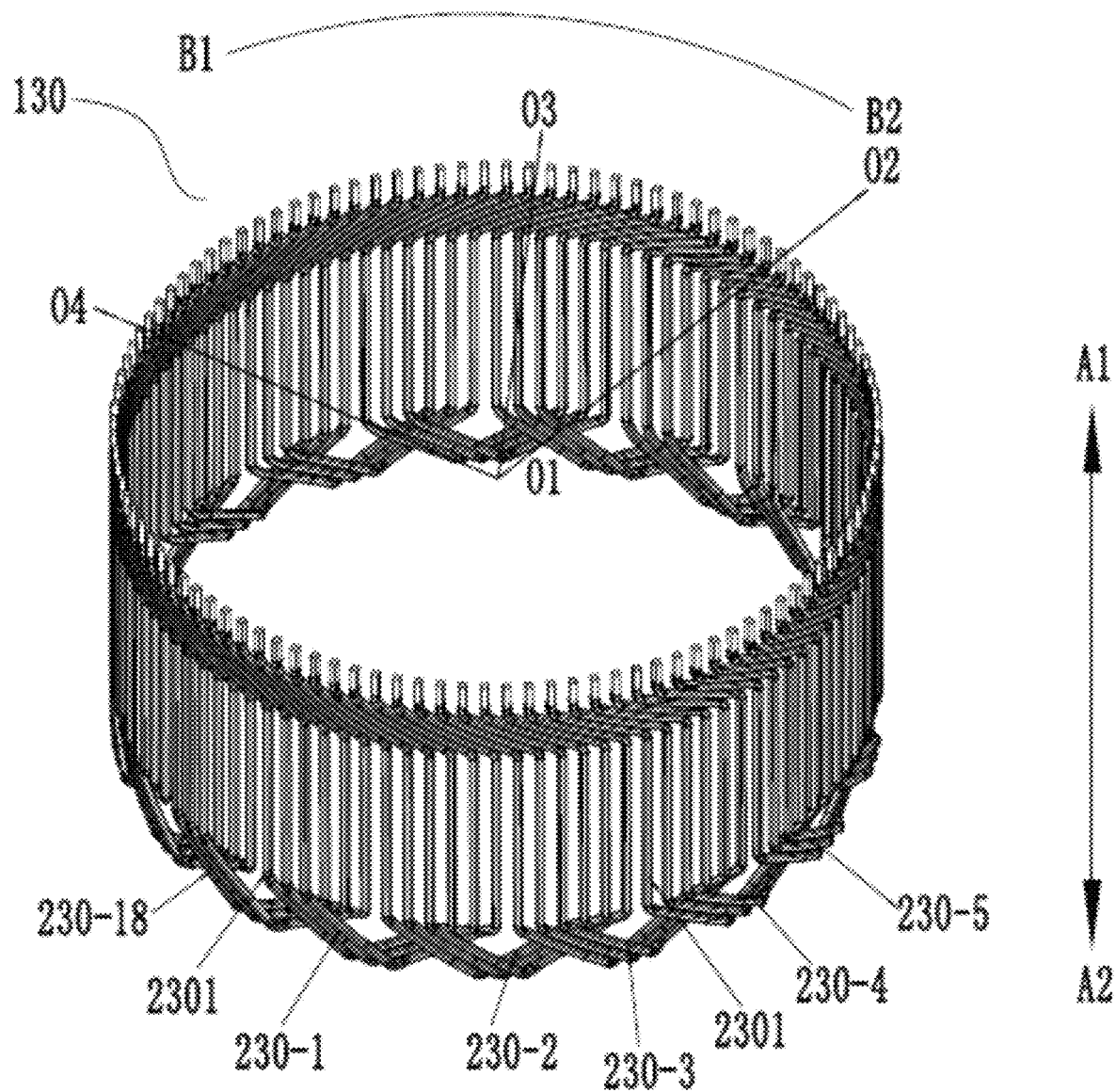
FIG. 5 is a schematic structural diagram of a third coil set of a stator winding of an electric motor stator according to an embodiment of the present disclosure.
Figure 6:
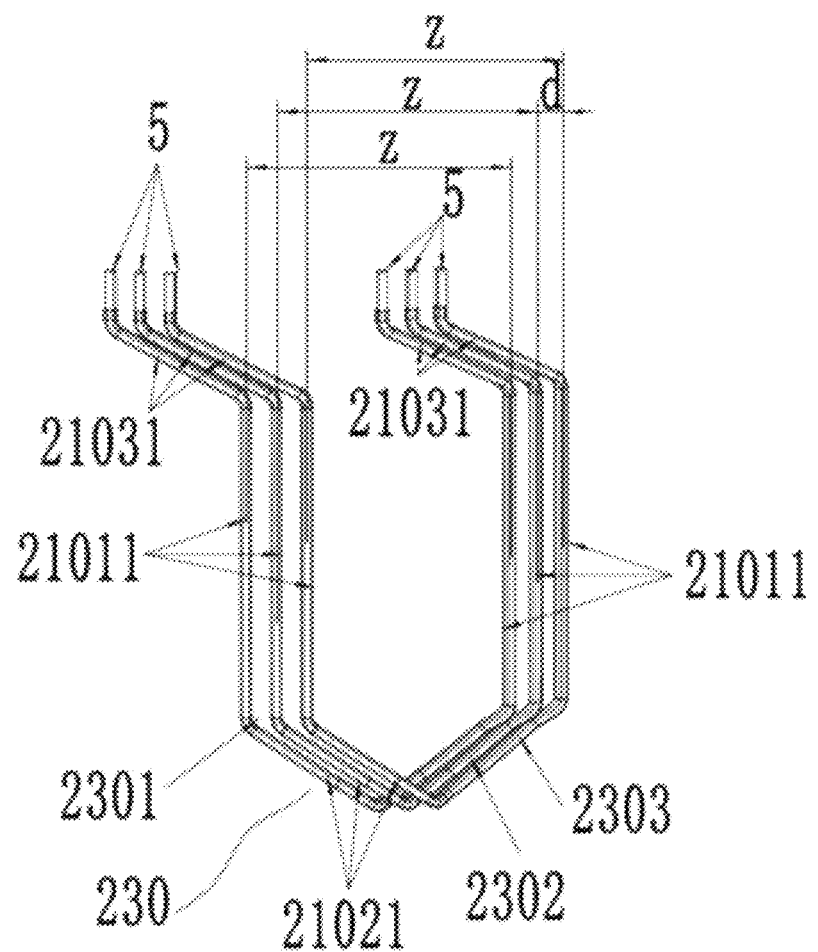
FIG. 6 is a schematic structural diagram of a third segmented coil unit of a third coil set of a stator winding of an electric motor stator according to an embodiment of the present disclosure.

As shown in FIG. 5 and FIG. 6, the third coil set 130 includes a plurality of third segmented coil units 230. Any one of the plurality of third segmented coil unit 230 is provided with hair-pin coils with a same pitch.

As shown in FIG. 5 and FIG. 6, in this embodiment, the third coil set 130 includes 18 third segmented coil units 230. Any third segmented coil unit 230 is provided with three hair-pin coils, that is, a first hair-pin coil 2301, a second hair-pin coil 2302 and a third hair-pin coil 2303. A slot pitch between two slot inner portions 21011 of the first hair-pin coil 2301 is Z, a slot pitch between two slot inner portions 21011 of the second hair-pin coil 2302 is Z, and a slot pitch between two slot inner portions 21011 of the third hair-pin coil 2303 is Z (in this embodiment, the slot pitch Z is 9). That is to say, the third segmented coil unit 230 is provided with three hair-pin coils with the same pitch.

The plurality of third segmented coil units 230 of the third coil set 130 are successively arranged at a same layer in the stator core slots 21 in the circumferential direction of the stator core.

As shown in FIG. 5 and FIG. 6, in this embodiment, the 18 third segmented coil units 230 of the third coil set 130 are successively arranged at the same layer in the stator core slots 21 in the circumferential direction of the stator core. Specifically, the slot inner portions 21011 of three hair-pin coils in the third segmented coil unit 230 are located at a same radial layer in different slots of the stator core. As shown in FIG. 6, a first slot inner portion 21011 (that is, the slot inner portion on the left side) of the first hair-pin coil 2301 is located at Nth layer (N being an even number) in the first slot of the stator core 20, a first slot inner portion 21011 (that is, the slot inner portion on the left side) of the second hair-pin coil 2302 is located at Nth layer in the second slot of the stator core 20, a first slot inner portion 21011 (that is, the slot inner portion on the left side) of the third hair-pin coil 2303 is located at Nth layer in the third slot of the stator core 20, a second slot inner portion 21011 (that is, the slot inner portion on the right side) of the first hair-pin coil 2301 is located at Nth layer in the tenth slot of the stator core 20, the second slot inner portion 21011 (that is, the slot inner portion on the right side) of the second hair-pin coil 2302 is located at Nth layer in the eleventh slot of the stator core 20, and the second slot inner portion 21011 (that is, the slot inner portion on the right side) of the third hair-pin coil 2303 is located at Nth layer in the twelfth slot of the stator core 20. In this embodiment, N equals 4. As shown in FIG. 5, the 18 third segmented coil units 230 of the third coil set 130 are successively arranged at the same radial layer in the 108 stator core slots of the stator core 20 in the circumferential direction of the stator core. In some embodiments, a slot pitch between the first slot inner portion of the first hair-pin coil 2301 of one third segmented coil unit 230-1 and the first slot inner portion of the first hair-pin coil 2301 of the other adjacent third segmented coil unit 230-4, which is same in phase, is 18. In some embodiments, the first slot inner portion 21011 of the first hair-pin coil 2301 of the third segmented coil unit 230-1 is located in the first slot of the stator core 20, and the first slot inner portion 21011 of the first hair-pin coil 2301 of the other third segmented coil unit 230-4 is located in the nineteenth slot of the stator core 20. Correspondingly, a V-phase third coil set 130, a W-phase third coil set 130, and a U-phase third coil set 130 are correspondingly and successively moved 3 or 6 slots in the circumferential direction of the stator core. In this embodiment, the third coil set 130 is disposed on the inner side of the stator core 20, that is, a layer away from the direction of the radial inner surface of the stator core is a fourth layer. In some embodiments, the third coil set 130 is disposed on the outer side of the stator core 20, that is, a layer close to the direction of the radial inner surface of the stator core is the first layer.

The pitches of the hair-pin coils in each first segmented coil unit 210 are different from the pitches of the hair-pin coils in each third segmented coil unit 230.

As shown in FIG. 4 and FIG. 6, in this embodiment, two different pitches of the hair-pin coils in the first segmented coil unit 210 are respectively the slot pitch X between the two slot inner portions 21011 of the second hair-pin coil 2102 (or the first hair-pin coil 2101) and the slot pitch Y between the two slot inner portions 21011 of the third hair-pin coil 2103 (in this embodiment, the slot pitch X is 10, and the slot pitch Y is 7). The slot pitch between the two slot inner portions 21011 of the hair-pin coils in the third segmented coil unit 230 is Z (in this embodiment, the slot pitch Z is 9). That is to say, the pitch of the hair-pin coils in the first segmented coil unit 210 is different from the pitch of the hair-pin coils in the third segmented coil unit 230. By adopting a single conductor to form an electric motor winding, bus bars among phases are canceled. The phases are directly connected, and a lead wire can be disposed at any slot and any layer. Therefore, a production cost is reduced, and processing efficiency is improved.

In some embodiments, as shown in FIG. 2, the stator winding 10 further includes a second coil set 120 disposed between the first coil set 110 and the third coil set 130. As shown in FIG. 7 to FIG. 10, the second coil set 120 includes a plurality of second segmented coil units 220. Any one of the plurality of second segmented coil unit 220 is provided with two hair-pin coils with different pitches, or, any one do the plurality of second segmented coil unit 220 is provided with hair-pin coils with a same pitch.

Figure 7:
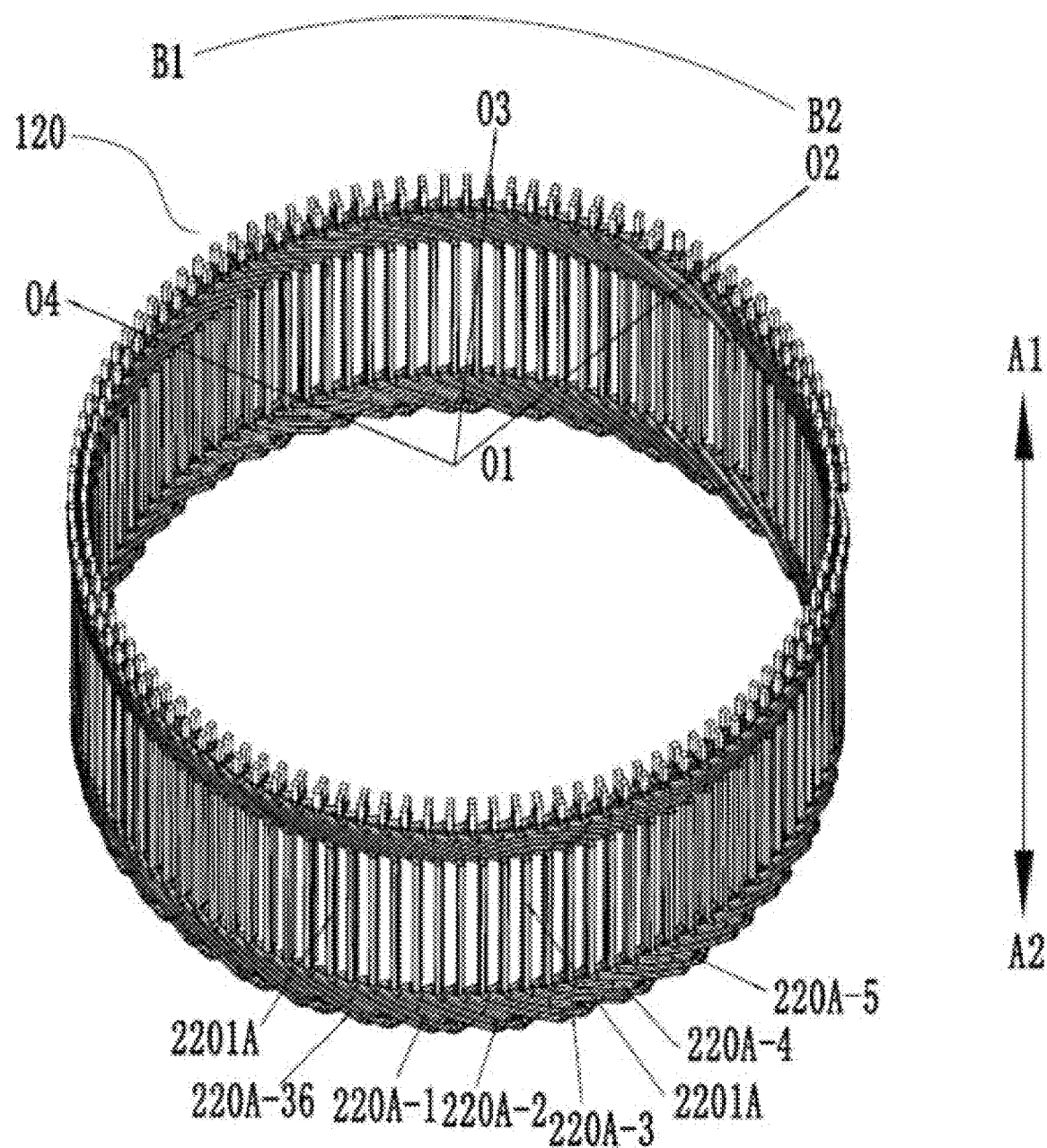
FIG. 7 is a schematic structural diagram of a second coil set of a stator winding of an electric motor stator according to an embodiment of the present disclosure.
Figure 8:
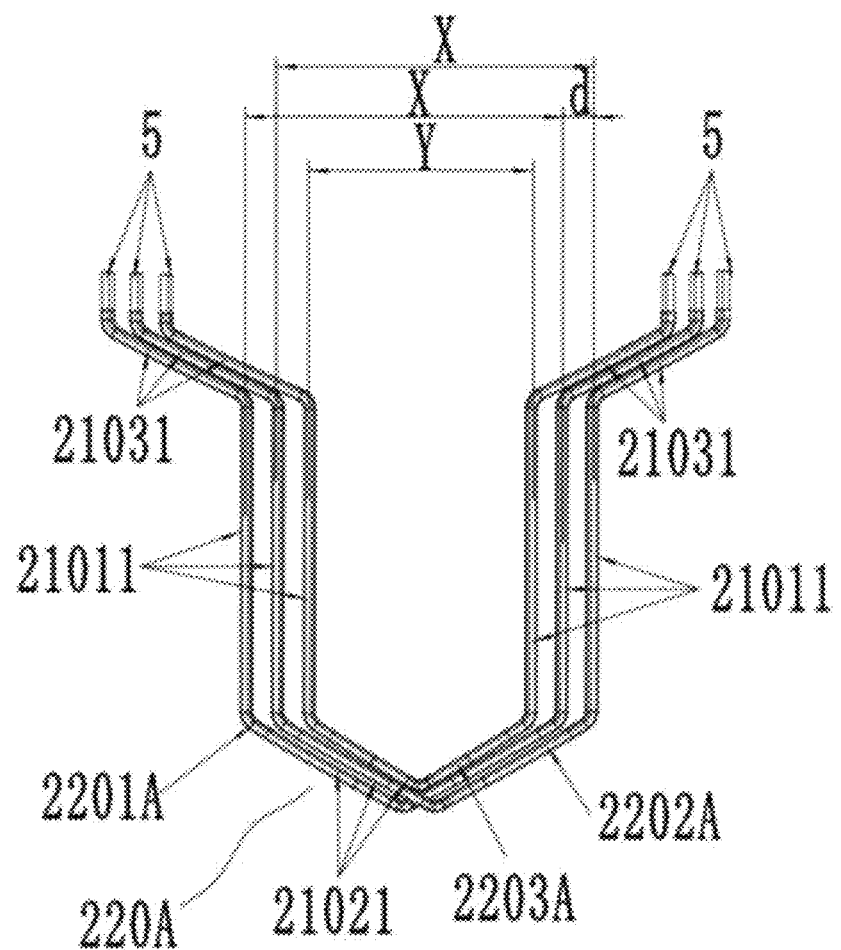
FIG. 8 is a schematic structural diagram of a second segmented coil unit of a second coil set of a stator winding of an electric motor stator according to an embodiment of the present disclosure.

In some embodiments, as shown in FIG. 2, the stator winding 10 further includes the second coil set 120 disposed between the first coil set 110 and the third coil set 130. As shown in FIG. 7 and FIG. 8, in this embodiment, the second coil set 120 includes 36 second segmented coil units 220A. Any second segmented coil unit 220A is provided with three hair-pin coils, that is, a first hair-pin coil 2201A, a second hair-pin coil 2202A, and a third hair-pin coil 2203A. A slot pitch between two slot inner portions 21011 of the first hair-pin coil 2201A is X, a slot pitch between two slot inner portions 21011 of the second hair-pin coil 2202A is X, and a slot pitch between two slot inner portions 21011 of the third hair-pin coil 2203A is Y (in this embodiment, the slot pitch X is 10, and the slot pitch Y is 7). That is to say, the second segmented coil unit 220A is provided with two hair-pin coils with different pitches. In this embodiment, the pitch of the first hair-pin coil 2201A is same as the pitch of the second hair-pin coil 2202A, and the pitch of the third hair-pin coils 2203A is different from that of the first hair-pin coil 2201A and the second hair-pin coil 2202A.

Figure 9:
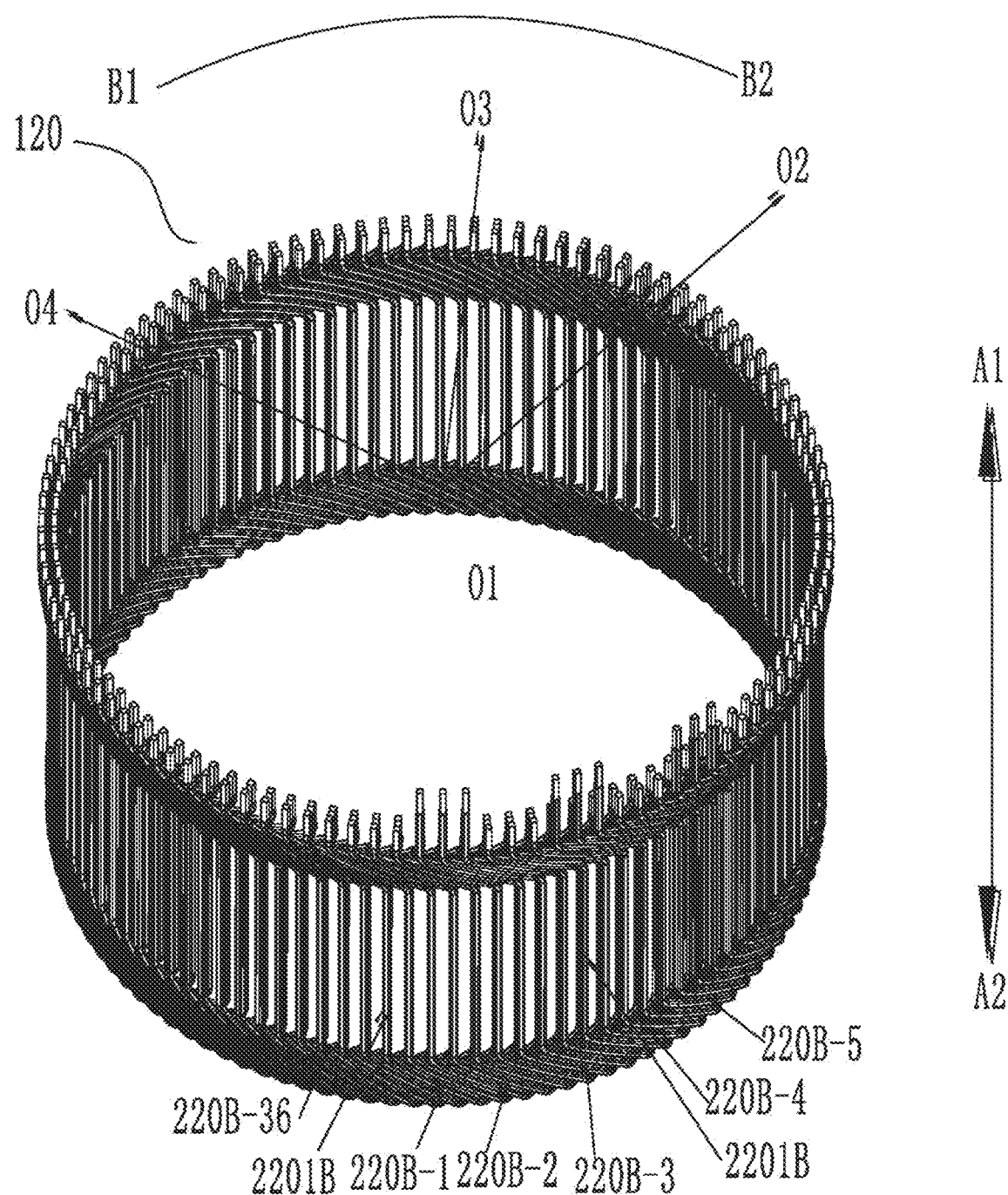
FIG. 9 is a schematic structural diagram of a second coil set of a stator winding of another electric motor stator according to an embodiment of the present disclosure.
Figure 10:
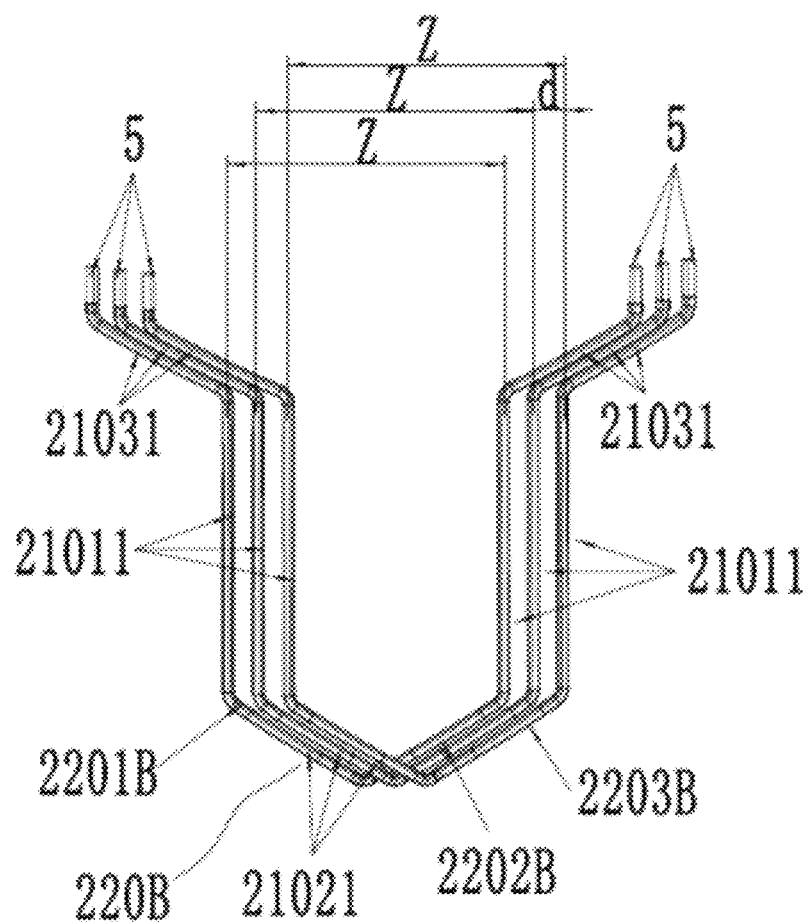
FIG. 10 is a schematic structural diagram of a second segmented coil unit of a second coil set of a stator winding of another electric motor stator according to an embodiment of the present disclosure.

In some embodiments, as shown in FIG. 2, the stator winding 10 further includes the second coil set 120 disposed between the first coil set 110 and the third coil set 130. As shown in FIG. 9 and FIG. 10, in this embodiment, the second coil set 120 includes 36 second segmented coil units 220B. Any second segmented coil unit 220B is provided with three hair-pin coils, that is, a first hair-pin coil 2201B, a second hair-pin coil 2202B, and a third hair-pin coil 2203B. A slot pitch between two slot inner portions 21011 of the first hair-pin coil 2201B is Z, a slot pitch between two slot inner portions 210 of the second hair-pin coil 2202B is Z, and a slot pitch between two slot inner portions 21011 of the third hair-pin coil 2203B is Z (in this embodiment, the slot pitch Z is 9). That is to say, the second segmented coil unit 220B is provided with three hair-pin coils with a same pitch.

In some embodiment, as shown in FIG. 7 and FIG. 9, the plurality of second segmented coil units 220A (220B) of the second coil set 120 are successively arranged at adjacent two layers in the stator core slots in the circumferential direction of the stator core.

In some embodiments, as shown in FIG. 7, the 36 second segmented coil units 220A of the second coil set 120 are successively arranged at adjacent two layers in the stator core slots 21 in the circumferential direction of the stator core. Specifically, the slot inner portions 21011 of three hair-pin coils in the second segmented coil unit 220A are located at the adjacent two radial layers in different slots of the stator core. As shown in FIG. 8, the first slot inner portion 21011 (that is, the slot inner portion on the left side) of the first hair-pin coil 2201A is located at N−2th layer in the first slot of the stator core 20, the first slot inner portion 21011 (that is, the slot inner portion on the left side) of the second hair-pin coil 2202A is located at N−2th layer in the second slot of the stator core 20, the first slot inner portion 21011 (that is, the slot inner portion on the left side) of the third hair-pin coil 2203A is located at N–2th layer in the third slot of the stator core 20, the second slot inner portion 21011 (that is, the slot inner portion on the right side) of the first hair-pin coil 2201A is located at N–1th layer in the eleventh slot of the stator core 20, the second slot inner portion 21011 (that is, the slot inner portion on the right side) of the second hair-pin coil 2202A is located at N–1th layer in the twelfth slot of the stator core 20, and the second slot inner portion 21011 (that is, the slot inner portion on the right side) of the third hair-pin coil 2203A is located at N–1th layer in the tenth slot of the stator core 20 (in this embodiment, N equals 4).

In some embodiments, as shown in FIG. 9, the 36 second segmented coil units 220B of the second coil set 120 are successively arranged at the adjacent two layers in the stator core slots 21 in the circumferential direction of the stator core. Specifically, the slot inner portions 21011 of three hair-pin coils in the second segmented coil unit 220B are located at the adjacent two radial layers in different slots of the stator core. As shown in FIG. 10, the first slot inner portion 21011 (that is, the slot inner portion on the left side) of the first hair-pin coil 2201B is located at N–2th layer in the first slot of the stator core 20, the first slot inner portion 21011 (that is, the slot inner portion on the left side) of the second hair-pin coil 2202B is located at N–2th layer in the second slot of the stator core 20, the first slot inner portion 21011 (that is, the slot inner portion on the left side) of the third hair-pin coil 2203B is located at N–2th layer in the third slot of the stator core 20, the second slot inner portion 21011 (that is, the slot inner portion on the right side) of the first hair-pin coil 2201B is located at N–1th layer in the tenth slot of the stator core 20, the second slot inner portion 21011 (that is, the slot inner portion on the right side) of the second hair-pin coil 2202B is located at N–1th layer in the eleventh slot of the stator core 20, and the second slot inner portion 21011 (that is, the slot inner portion on the right side) of the third hair-pin coil 2203B is located at N–1th layer in the twelfth slot of the stator core 20.

As shown in FIG. 7 and FIG. 9, the 36 second segmented coil units 220 of the second coil set 120 are successively arranged at the adjacent two layers in the 108 stator core slots of the stator core 20 in the circumferential direction of the stator core. In some embodiments, a pitch between two adjacent second segmented coil units 220-1 (220A-1 or 220B-1) and 220-4 (220A-4 corresponding to 220A-1 or 220B-4 corresponding to 220B-1), which are same in phase, is 9. In some embodiments, the first slot inner portion 21011 of the first hair-pin coil 2201 (2201A or 2201B) of one second segmented coil unit 220-1 is located in the first slot of the stator core 20, and the first slot inner portion 21011 of the first hair-pin coil 2201 (2201A or 2201B) of another second segmented coil unit 220-4 is located in the tenth slot of the stator core 20. Correspondingly, a V-phase second coil set 120, a W-phase second coil set 120, and a U-phase second coil set 120 are correspondingly and successively moved 3 or 6 slots in the circumferential direction of the stator core. In this embodiment, the second coil set 120 is disposed at intermediate N–2 layer and N–3 layer in the stator core 20, that is, an inner layer close to the direction of the radial inner surface of the stator core is the Nth layer. In this embodiment, the second coil set 120 is located at a second layer and a third layer in the radial direction of the stator core.

In some embodiments, as shown in FIG. 2, the pitches of the hair-pin coils of each second segmented coil unit 220A are the same as the pitches of the hair-pin coils of each first segmented coil unit 210.

In some embodiments, as shown in FIG. 4 and FIG. 8, in this embodiment, the second segmented coil unit 220A is provided with the first hair-pin coil 2201A, the second hair-pin coil 2202A, and the third hair-pin coil 2203A. The slot pitch between two slot inner portions 21011 of the first hair-pin coil 2201A is X, the slot pitch between two slot inner portions 21011 of the second hair-pin coil 2202A is X, and the slot pitch between two slot inner portions 21011 of the third hair-pin coil 2203A is Y (in this embodiment, the slot pitch X is 10, and the slot pitch Y is 7). The first segmented coil unit 210 is provided with the first hair-pin coil 2101, the second hair-pin coil 2102, and the third hair-pin coil 2103. The slot pitch between the two slot inner portions 21011 of the first hair-pin coil 2101 is X, the slot pitch between the two slot inner portions 21011 of the second hair-pin coil 2102 is X, and the slot pitch between the two slot inner portions 21011 of the third hair-pin coil 2103 is Y (in this embodiment, the slot pitch X is 10, the slot pitch Y is 7). Therefore, the pitches of the hair-pin coils of each second segmented coil unit 220A are the same as the pitches of the hair-pin coils of each first segmented coil unit 210.

In some embodiments, as shown in FIG. 6 and FIG. 10, the pitches of the hair-pin coils of each second segmented coil unit 220B are the same as the pitches of the hair-pin coils of each third segmented coil unit 230.

As shown in FIG. 6 and FIG. 10, in this embodiment, the second segmented coil unit 220B is provided with the first hair-pin coil 2201B, the second hair-pin coil 2202B, and the third hair-pin coil 2203B. The slot pitch between two slot inner portions 21011 of the first hair-pin coil 2201B is Z, the slot pitch between the two slot inner portions 21011 of the second hair-pin coil 2202B is Z, and the slot pitch between the two slot inner portions 21011 of the third hair-pin coil 2203B is Z (in this embodiment, the slot pitch Z is 9). The third segmented coil unit 230 is provided with the first hair-pin coil 2301, the second hair-pin coil 2302, and the third hair-pin coil 2303. The slot pitch between the two slot inner portions 21011 of the first hair-pin coil 2301 is Z, the slot pitch between the two slot inner portions 21011 of the second hair-pin coil 2302 is Z, and the slot pitch between the two slot inner portions 21011 of the third hair-pin coil 2303 is Z (in this embodiment, the slot pitch Z is 9). Therefore, the pitches of the hair-pin coils of each second segmented coil unit 220B are the same as the pitches of the hair-pin coils of each third segmented coil unit 230.

Figure 11:
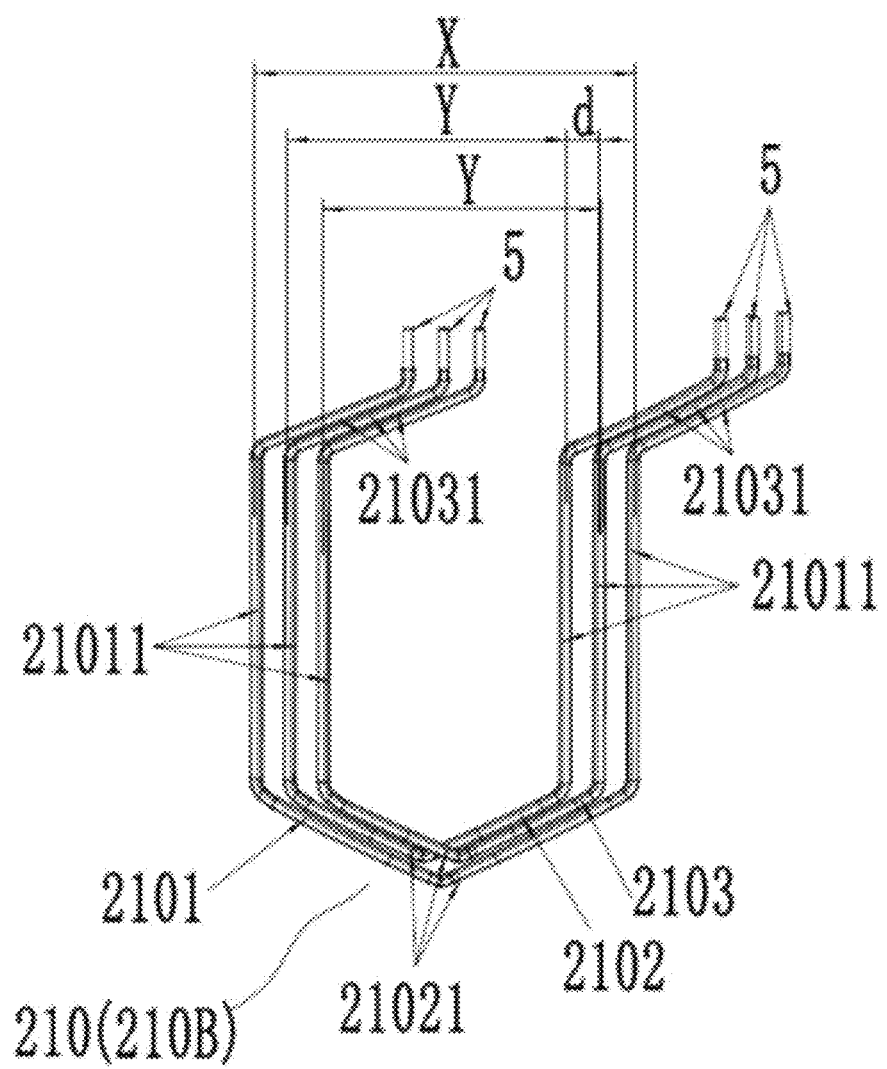
FIG. 11 is a schematic structural diagram of a first segmented coil unit of a first coil set of a stator winding of another electric motor stator according to an embodiment of the present disclosure.

In some embodiments, as shown in FIG. 4 and FIG. 11, each first segmented coil unit 210 includes at least one long-pitch hair-pin coil or at least one short-pitch hair-pin coil.

Figure 12:
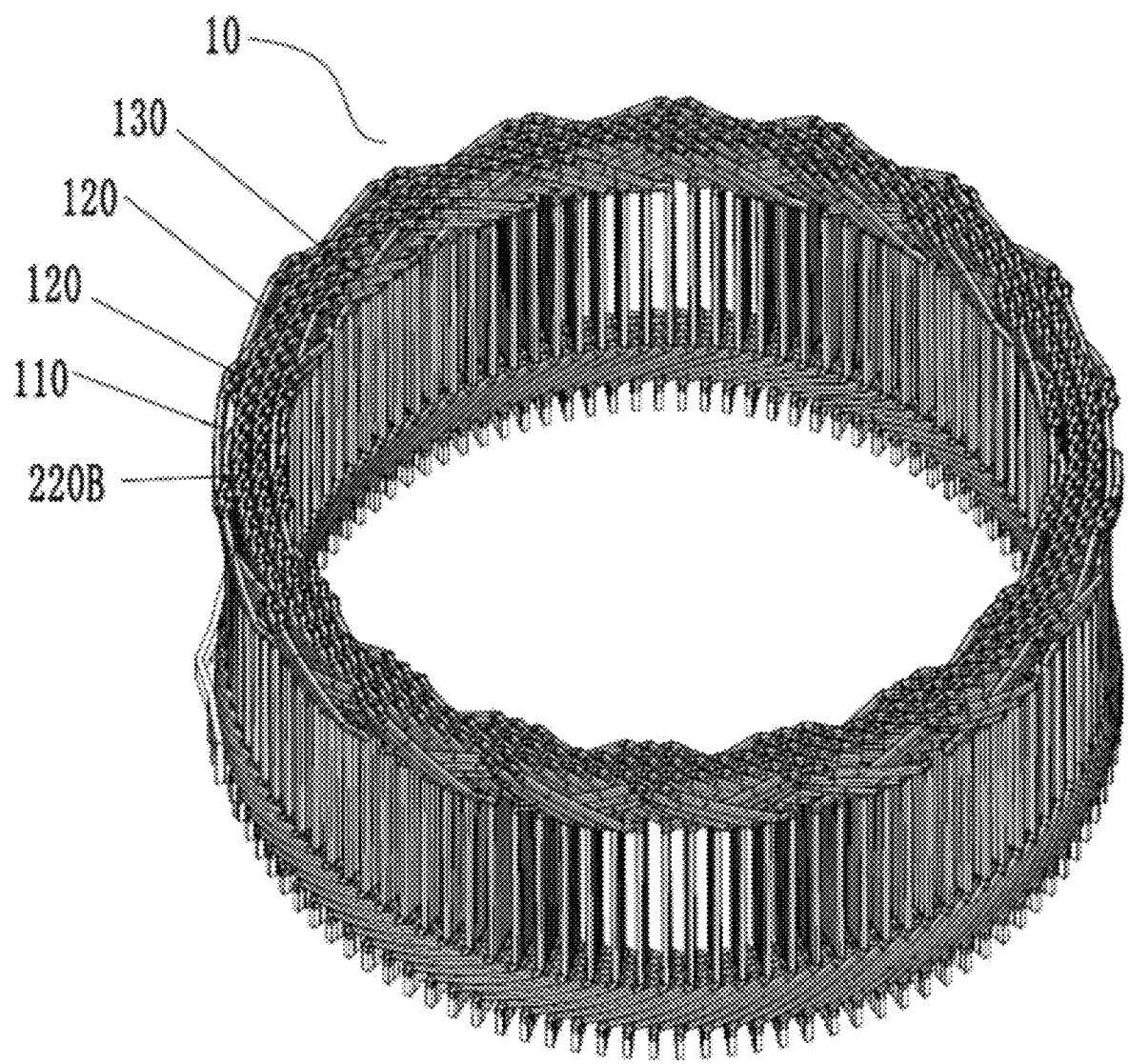
FIG. 12 is a schematic structural diagram of a stator winding of another electric motor stator according to an embodiment of the present disclosure.

In some embodiments, as shown in FIG. 4 and FIG. 11, the first segmented coil unit 210A is provided with the first hair-pin coil 2101, the second hair-pin coil 2102, and the third hair-pin coil 2103. The slot pitch between two slot inner portions 21011 of the first hair-pin coil 2101 is X, the slot pitch between two slot inner portions 21011 of the second hair-pin coil 2102 is X, and the slot pitch between two slot inner portions 21011 of the third hair-pin coil 2103 is Y (in this embodiment, the slot pitch X is 10, and the slot pitch Y is 7). In this embodiment, the hair-pin coil that the slot pitch between the two slot inner portions of the hair-pin coil is 9 is a diameter pitch hair-pin coil, the hair-pin coil whose slot pitch is greater than 9 is a long pitch hair-pin coil, and the hair-pin coil whose slot pitch is less than 9 is a short pitch hair-pin coil. Therefore, in FIG. 4, the first segmented coil unit 210A includes two long-pitch hair-pin coils and one short-pitch hair-pin coil. Correspondingly, as shown in FIG. 11 and FIG. 12, the first segmented coil unit 210B is provided with the first hair-pin coil 2101, the second hair-pin coil 2102, and the third hair-pin coil 2103. The slot pitch between the two slot inner portions 21011 of the first hair-pin coil 2101 is X, the slot pitch between the two slot inner portions 21011 of the second hair-pin coil 2102 is Y, and the slot pitch between the two slot inner portions 21011 of the third hair-pin coil 2103 is Y (in this embodiment, the slot pitch X is 11, the slot pitch Y is 8). In this embodiment, the hair-pin coil that the slot pitch between the two slot inner portions of the hair-pin coil is 9 is the diameter pitch hair-pin coil, the hair-pin coil whose slot pitch is greater than 9 is the long pitch hair-pin coil, and the hair-pin coil whose slot pitch is less than 9 is the short pitch hair-pin coil. Therefore, in FIG. 11 and FIG. 12, the first segmented coil unit 210B includes one long-pitch hair-pin coil and two short-pitch hair-pin coils.

In some embodiments, as shown in FIG. 5, each third segmented coil unit 230 includes the hair-pin coil with the diameter pitch.

In some embodiments, as shown in FIG. 5, the third segmented coil unit 230 is provided with the first hair-pin coil 2301, the second hair-pin coil 2302, and the third hair-pin coil 2303. The slot pitch between the two slot inner portions 21011 of the first hair-pin coil 2301 is Z, the slot pitch between the two slot inner portions 21011 of the second hair-pin coil 2302 is Z, and the slot pitch between the two slot inner portions 21011 of the third hair-pin coil 2303 is Z (in this embodiment, the slot pitch Z is 9). In this embodiment, the hair-pin coil that the slot pitch between the two slot inner portions of the hair-pin coil is 9 is the diameter pitch hair-pin coil. Therefore, in FIG. 5, the third segmented coil unit 230 includes three hair-pin coils with the diameter pitch.

In some embodiment, as shown in FIG. 4 and FIG. 11, each first segmented coil unit 210 includes one long-pitch hair-pin coil and two short-pitch hair-pin coils, or, each first segmented coil unit 210 includes two long-pitch hair-pin coils and one short-pitch hair-pin coil.

In some embodiments, as shown in FIG. 4, the first segmented coil unit 210A is provided with the first hair-pin coil 2101, the second hair-pin coil 2102, and the third hair-pin coil 2103. The slot pitch between the two slot inner portions 21011 of the first hair-pin coil 2101 is X, the slot pitch between the two slot inner portions 21011 of the second hair-pin coil 2102 is X, and the slot pitch between the two slot inner portions 21011 of the third hair-pin coil 2103 is Y (in this embodiment, the slot pitch X is 10, and the slot pitch Y is 7). Therefore, in FIG. 4, the first segmented coil unit 210A includes two long-pitch hair-pin coils and one short-pitch hair-pin coil.

In some embodiments, as shown in FIG. 11 and FIG. 12, the first segmented coil unit 210B is provided with the first hair-pin coil 2101, the second hair-pin coil 2102, and the third hair-pin coil 2103. The slot pitch between the two slot inner portions 21011 of the first hair-pin coil 2101 is X, the slot pitch between the two slot inner portions 21011 of the second hair-pin coil 2102 is Y, and the slot pitch between the two slot inner portions 21011 of the third hair-pin coil 2103 is Y (in this embodiment, the slot pitch X is 11, and the slot pitch Y is 8). Therefore, in FIG. 11 and FIG. 12, the first segmented coil unit 210B includes one long-pitch hair-pin coil and two short-pitch hair-pin coils.

In some embodiments, as shown in FIG. 1 to FIG. 11, each hair-pin coil of each segmented coil unit in each coil set of the stator winding 10 includes a first slot outer end portion 21031, a first slot inner portion 21011, a first slot outer turning portion 21021, a second slot inner portion 21011, and a second slot outer end portion 21031 that are successively connected. The first slot inner portion 21011 and the second slot inner portion 21011 are located in different slots. The first slot outer turning portion 21021 of each hair-pin coil of each segmented coil unit in each coil set of the stator winding 10 is located on a side of the end surface 26 of the stator core 20, and the slot outer end portions (that is, the first slot outer end portion 21031 and the second slot outer end portion 21031) of each hair-pin coil of each segmented coil unit in each coil set of the stator winding 10 are located on a side of the other end surface 25 of the stator core 20.

Optionally, on the basis of the above embodiments, as shown in FIG. 1 to FIG. 11, in this embodiment, the hair-pin coil includes the first slot outer end portion 21031, the first slot inner portion 21011, the first slot outer turning portion 21021, the second slot inner portion 21011, and the second slot outer end portion 21031 that are successively connected. The first slot inner portion 21011 and the second slot inner portion 21011 are located in different slots. The first slot outer turning portions 21021 of the first coil set 110, the second coil set 120 and the third coil set 130 of the stator winding 10 are located on the side of the end surface 26 of the stator core 20, and the first slot outer end portions 21031 and the second slot outer end portions 21031 of the first coil set 110, the second coil set 120 and the third coil set 130 of the stator winding 10 are located on the side of the other end surface 25 of the stator core 20.

In some embodiments, as shown in FIG. 1 to FIG. 11, the slot outer end portions 21031 (that is, the first slot outer end portion 21031 and the second slot outer end portion 21031) of each hair-pin coil of each segmented coil unit 210 (including the first segmented coil unit 210A and the first segmented coil unit 210B) of the first coil set 110 have a same extending direction in the circumferential direction of the stator core. The slot outer end portions 21031 (that is, the first slot outer end portion 21031 and the second slot outer end portion 21031) of each hair-pin coil of each third segmented coil unit 230 of the third coil set 130 have a same extending direction in the circumferential direction of the stator core. The slot outer end portions 21031 of each hair-pin coil of each segmented coil unit 210 of the first coil set 110 and the slot outer end portions 21031 of each hair-pin coil of each third segmented coil unit 230 of the third coil set 130 have opposite extending directions in the circumferential direction of the stator core.

In some embodiments, as shown in FIG. 2 to FIG. 6, in this embodiment, all of the slot outer end portions 21031 (that is, the first slot outer end portion 21031 and the second slot outer end portion 21031) of the first coil set 110 extend rightwards in the same direction in the circumferential direction of the stator core. All of the slot outer end portions 21031 (that is, the first slot outer end portion 21031 and the second slot outer end portion 21031) of the third coil set 130 extend leftwards in the same direction in the circumferential direction of the stator core. The extending direction of all of the slot outer end portions of the first coil set 110 in the circumferential direction of the stator core is opposite to the extending direction of all of the slot outer end portions of the third coil set 130 in the circumferential direction of the stator core.

In some embodiments, all of the slot outer end portions 21031 of the first coil set 110 extend leftwards in the same direction in the circumferential direction of the stator core. All of the slot outer end portions 21031 of the third coil set 130 extend rightwards in the same direction in the circumferential direction of the stator core. The extending direction of all of the slot outer end portions of the first coil set 110 in the circumferential direction of the stator core is opposite to the extending direction of all of the slot outer end portions of the third coil set 130 in the circumferential direction of the stator core.

In some embodiments, as shown in FIG. 1 to FIG. 11, the slot inner portions 21011 (that is, the first slot inner portion 21011 and the second slot inner portion 21011) of each hair-pin coil of each segmented coil unit of the stator winding 10 and the slot outer end portions 21031 (that is, the first slot outer end portion 21031 and the second slot outer end portion 21031) connected with the slot inner portions and extended in the circumferential direction of the stator core are located at a same layer of the stator core.

Optionally, on the basis of the above embodiments, as shown in FIG. 1 to FIG. 11, each slot inner portion 21011 of the first hair-pin coil 2101 of each first segmented coil unit 210 of the stator winding 10 and a slot outer end portion 21031 connected with the each slot inner portion and extended in the circumferential direction of the stator core are located at the first layer. Each slot inner portion 21011 of the second hair-pin coil 2102 and a slot outer end portion 21031 connected with the each slot inner portion and extended in the circumferential direction of the stator core are located at the first layer. Each slot inner portion 21011 of the third hair-pin coil 2103 and a slot outer end portion 21031 connected with the each slot inner portion and extended in the circumferential direction of the stator core are located at the first layer. The first slot inner portion 21011 and the first slot outer end portion 21031 of the first hair-pin coil 2201 of the second segmented coil unit 220 of the stator winding 10 are located on the N−2th layer. The second slot inner portion 21011 and the second slot outer end portion 21031 of the first hair-pin coil 2201 are located on the N−1th layer. The first slot inner portion 21011 and the first slot outer end portion 21031 of the second hair-pin coil 2202 are located on the N−2th layer. The second slot inner portion 21011 and the second slot outer end portion 21031 of the second hair-pin coil 2202 are located on the N−1th layer. The first slot inner portion 21011 and the first slot outer end portion 21031 of the third hair-pin coil 2203 are located on the N−2th layer. The second slot inner portion 21011 and the second slot outer end portion 21031 of the third hair-pin coil 2203 are located on the N−1th layer. Each slot inner portion 21011 of the first hair-pin coil 2301 of each third segmented coil unit 230 of the stator winding 10 and a slot outer end portion 21031 connected with the each slot inner portion and extended in the circumferential direction of the stator core are located at the Nth layer. Each slot inner portion 21011 of the second hair-pin coil 2302 and a slot outer end portion 21031 connected with the each slot inner portion and extended in the circumferential direction of the stator core are located at the Nth layer. Each slot inner portion 21011 of the third hair-pin coil 2303 and a slot outer end portion 21031 connected with the each slot inner portion and extended in the circumferential direction of the stator core are located at the Nth layer, wherein N is an even number (in this embodiment, N equals 6).

In some embodiments, as shown in FIG. 1 to FIG. 11, each slot outer end portion 21031 of each hair-pin coil of each segmented coil unit in each coil set of the stator winding 10 and the slot outer end portion 21031 radially adjacent to the each slot outer end portion 21031 extend in opposite directions in the circumferential direction of the stator core.

Optionally, on the basis of the above embodiments, as shown in FIG. 1, FIG. 3, FIG. 5, FIG. 7, and FIG. 9, in this embodiment, the slot outer end portions 21031 of the first coil set 110 are located at the first radial layer in the stator core slot 21 and extend rightwards in the circumferential direction of the stator core. The first slot outer end portions 21031 of the second coil set 120 are located at the N−2th radial layer in the stator core slot 21 and extend leftwards in the circumferential direction of the stator core. The second slot outer end portions 21031 of the second coil set 120 are located at the N−1th radial layer in the stator core slot 21 and extend rightwards in the circumferential direction of the stator core. The slot outer end portions 21031 of the third coil set 130 are located at the Nth radial layer in the stator core slot 21 and extend leftwards in the circumferential direction of the stator core. Therefore, the adjacent two slot outer end portions 21031 in the radial direction of the stator core have opposite extending directions in the circumferential direction of the stator core (in this embodiment, N equals 6).

In some embodiments, as shown in FIG. 1 to FIG. 11, the first slot outer end portion 21031 and the second slot outer end portion 21031 have extending ends 5. Except the extending ends connected with lead wires 4, an extending end 5 of the N−1 layer and an extending end 5 of the N layer in a same radial direction of the stator core are connected, the extending end 5 of the N layer is adjacent to the extending end 5 of the N−1 layer, wherein N is an even number.

In some embodiments, as shown in FIG. 1 to FIG. 14, in this embodiment, the first slot outer end portion 21031 and the second slot outer end portion 21031 have extending ends 5. Except the extending ends 5 connected with the lead wires 4 (the lead wires in the embodiments of the present disclosure include terminals and neutral points of the phases, that is, a U-phase terminal, a V-phase terminal, a W-phase terminal, a U-phase neutral point, a V-phase neutral point, and a W-phase neutral point), an extending end of the first layer and an extending end of the second layer in the same radial direction of the stator core are connected, the extending end of the first layer is adjacent to the extending end of the second layer; an extending end of third layer and an extending end of the fourth layer in the same radial direction of the stator core are connected, the extending end of the third layer is adjacent to the extending end of the fourth layer; and an extending end of a fifth layer and an extending end of a sixth layer in the same radial direction of the stator core are connected, the extending end of the fifth layer is adjacent to the extending end of the sixth layer. In some embodiments, the connected extending ends of the two slot outer end portions in the stator winding are located at an odd layer and a radially adjacent even layer in the stator core. Due to few types of coil unit and a simple arrangement mode, the use of the bus strips and the bus bars can be reduced, so that the terminals and the neutral points of the branches of each phase winding can be disposed in any slot and any layer, thereby lowering a degree of complexity of the manufacturing technique, reducing the production cost and increasing the processing efficiency.

A manufacturing method is shown as follows.

In some embodiments, as shown in FIG. 1, a U-phase winding, a V-phase winding, and a W-phase winding of a stator winding 10 adopt a star connection. Three branches U1, U2, and U3 of the U-phase winding are in parallel connection, three branches V1, V2, and V3 of the V-phase winding are in parallel connection, and three branches W1, W2, and W3 of the W-phase winding are in parallel connection. Each of the branches is in serial connection. The V-phase winding, the W-phase winding, and the U-phase winding are same in connection, which will not be described in detail herein.

A first coil set 110, a second coil set 120 (a quantity of the second coil set may be set to 0, 1, 2, 3, or any integral value), and a third coil set 130 are successively disposed in the stator winding from outside to inside.

In some embodiments, as shown in FIG. 1 to FIG. 4, the first coil set 110 is composed of a U-phase first coil set, a V-phase first coil set, and a W-phase first coil set. The first coil set 110 of each phase includes 6 first segmented coil units 210, so that the first coil sets of the three phases include 18 first segmented coil units 210. Each first segmented coil unit 210 is composed of three U-shaped hair-pin coils 2101, 2102, and 2103.

Firstly, the 18 first segmented coil units 210 are successively inserted into adjacent 108 slots from the end surface 26 of the stator core to the end surface 25 of the stator core. The first segmented coil unit 210-1 is inserted into a first layer in a first slot, a first layer in a second slot, a first layer in a third slot, a first layer in a tenth slot, a first layer in an eleventh slot, and a first layer in a twelfth slot of the stator core. The first segmented coil unit 210-2 (the first first segmented coil unit 210 of the W phase) is inserted into a first layer in a seventh slot, a first layer in an eighth slot, a first layer in a ninth slot, a first layer in a sixteenth slot, a first layer in a seventeenth slot, and a first layer in an eighteenth slot of the stator core. The first segmented coil unit 210-3 (the first first segmented coil unit 210 of the V phase) is inserted into a first layer in a thirteenth slot, a first layer in a fourteenth slot, a first layer in a fifteenth slot, a first layer in a twenty second slot, a first layer in a twenty third slot, and a first layer in a twenty fourth slot of the stator core. The first segmented coil unit 210-4 (the second first segmented coil unit 210 of the U phase) is inserted into a first layer in a nineteenth slot, a first layer in a twentieth slot, a first layer in a twenty first slot, a first layer in a twenty eighth slot, a first layer in a twenty ninth slot, and a first layer in a thirtieth slot of the stator core. Then, the first segmented coil unit 210-5 (the second first segmented coil unit 210 of the W phase) is inserted into a first layer in a twenty fifth slot, a first layer in a twenty sixth slot, a first layer in a twenty seventh slot, a first layer in a thirty fourth slot, a first layer in a thirty fifth slot, and a first layer in a thirty sixth slot of the stator core, until the first segmented coil unit 210-18 (the sixth first segmented coil unit 210 of the V phase) is inserted into a first layer in a one hundred and third slot, a first layer in a one hundred and fourth slot, a first layer in a one hundred and fifth slot, a first layer in a fourth slot, a first layer in a fifth slot, and a first layer in a sixth slot of the stator core.

In some embodiments, as shown in FIG. 1 to FIG. 8, secondly, the second coil set 120 is composed of a U-phase second coil set, a V-phase second coil set, and a W-phase second coil set. The second coil set 120 of each phase includes 12 second segmented coil units 220, so that the second coil sets of the three phases include 36 second segmented coil units 220. Each second segmented coil unit 220 is composed of three U-shaped hair-pin coils 2201, 2202, and 2203.

Firstly, the 36 second segmented coil units 220 are successively inserted into the adjacent 108 slots from the end surface 26 of the stator core to the end surface 25 of the stator core. The second segmented coil unit 220-1 is inserted into a second layer in the first slot, a second layer in the second slot, a second layer in the third slot, a third layer in the tenth slot, a third layer in the eleventh slot, and a third in the twelfth slot of the stator core. The second segmented coil unit 220-2 (the first second segmented coil unit 220 of the W phase) is inserted into a second layer in the fourth slot, a second layer in the fifth slot, a second layer in the sixth slot, a third layer in the thirteenth slot, a third layer in the fourteenth slot, and a third layer in the fifteenth slot of the stator core. The second segmented coil unit 220-3 (the first second segmented coil unit 220 of the V phase) is inserted into a second layer in the seventh slot, a second layer in the eighth slot, a second layer in the ninth slot, a third layer in the sixteenth slot, a third layer in the seventeenth slot, and a third layer in the eighteenth slot of the stator core. The first segmented coil unit 220-4 (the second second segmented coil unit 220 of the U phase) is inserted into a second layer in the tenth slot, a second layer in the eleventh slot, a second layer in twelfth slot, a third layer in the nineteenth slot, a third layer in the twentieth slot, and a third layer in the twenty first slot of the stator core. Then, the first segmented coil unit 220-5 (the second second segmented coil unit 220 of the W phase) is further inserted into a second layer in the thirteenth slot, a second layer in the fourteenth slot, a second layer in the fifteenth slot, a third layer in the twenty second slot, a third layer in the twenty third slot, and a third layer in twenty fourth slot of the stator core, until the second segmented coil unit 210-36 (the twelfth second segmented coil unit 220 of the V phase) is inserted into a second layer in a one hundred and sixth slot, a second layer in a one hundred and seventh slot, a second layer in a one hundred and eighth slot, a third layer in the seventh slot, a third layer in the eighth slot, and a third layer in the ninth slot of the stator core.

It is to be noted that, for ease of understanding the different embodiments of the present disclosure, in the embodiment shown in FIG. 7 and the embodiment shown in FIG. 9, different numbers are adopted to show the second segmented coil units. Specifically, the above second segmented coil unit 220-1 may be the second segmented coil unit 220A-1 shown in FIG. 7, or may be the second segmented coil unit 220B-1 shown in FIG. 9. The above second segmented coil unit 220-2 may be the second segmented coil unit 220A-2 shown in FIG. 7, or may be the second segmented coil unit 220B-2 shown in FIG. 9. The above second segmented coil unit 220-3 may be the second segmented coil unit 220A-3 shown in FIG. 7, or may be the second segmented coil unit 220B-3 shown in FIG. 9. The above second segmented coil unit 220-4 may be the second segmented coil unit 220A-4 shown in FIG. 7, or may be the second segmented coil unit 220B-4 shown in FIG. 9. The above second segmented coil unit 220-5 may be the second segmented coil unit 220A-2 shown in FIG. 7, or may be the second segmented coil unit 220B-5 shown in FIG. 9. The above second segmented coil unit 220-36 may be the second segmented coil unit 220A-36 shown in FIG. 7, or may be the second segmented coil unit 220B-36 shown in FIG. 9, and so on.

In the same way, the second second segmented coil unit is inserted into a fourth layer and a fifth layer in the stator core slots.

In some embodiment, as shown in FIG. 1 to FIG. 6, secondly, the third coil set 130 is composed of a U-phase third coil set, a V-phase third coil set, and a W-phase third coil set. The third coil set 130 of each phase includes 6 third segmented coil units 230, so that the third coil sets of the three phases include 18 third segmented coil units 230. Each third segmented coil unit 230 is composed of three U-shaped hair-pin coils 2301, 2302, and 2303.

Firstly, the 18 third segmented coil units 230 are successively inserted into the adjacent 108 slots from the end surface 26 of the stator core to the end surface 25 of the stator core. The third segmented coil unit 230-1 is inserted into a sixth layer in the first slot, a sixth layer in the second slot, a sixth layer in the third slot, a sixth layer in the tenth slot, a sixth layer in the eleventh slot, and a sixth layer in the twelfth slot of the stator core. The third segmented coil unit 230-2 (the first third segmented coil unit 230 of the W phase) is inserted into a sixth layer in the seventh slot, a sixth layer in the eighth a lot, a sixth layer in the ninth slot, a sixth layer in the sixteenth slot, a sixth layer in the seventeenth slot, and a sixth layer in the eighteenth slot of the stator core. The third segmented coil unit 230-3 (the first third segmented coil unit 230 of the V phase) is inserted into a sixth layer in the thirteenth slot, a sixth layer in the fourteenth slot, a sixth layer in the fifteenth slot, a sixth layer in the twenty second slot, a sixth layer in the twenty third slot, and a sixth layer in the twenty fourth slot of the stator core. The third segmented coil unit 230-4 (the second third segmented coil unit 230 of the U phase) is inserted into a sixth layer in the nineteenth slot, a sixth layer in the twentieth slot, a sixth layer in the twenty first slot, a sixth layer in the twenty eighth slot, a sixth layer in the twenty ninth slot, and a sixth layer in the thirtieth slot of the stator core. Then, the third segmented coil unit 230-5 (the second third segmented coil unit 230 of the W phase) is inserted into a sixth layer in the twenty fifth slot, a sixth layer in the twenty sixth slot, a sixth layer in the twenty seventh slot, a sixth layer in the thirty fourth slot, a sixth layer in the thirty fifth slot, and a sixth layer in the thirty sixth slot of the stator core, until the third segmented coil unit 230-18 (the sixth third segmented coil unit 230 of the V phase) is inserted into a sixth layer in the one hundred and third slot, a sixth layer in the one hundred and fourth slot, a sixth layer in the one hundred and fifth slot, a sixth layer in the fourth slot, a sixth layer in the fifth slot, and a sixth layer in the sixth slot of the stator core.

As shown in FIG. 1 to FIG. 8, finally, the slot inner portions 21011, located in the stator core slots 21, of the stator winding are extended outside the other end surface 25 of the stator core 20 in an axial direction. The slot outer end portions at the first layer (that is, the slot outer end portions of the first coil set 110) outside the stator core slots are bent and extended 3 slot pitches (i.e. 3d) in a same direction (rightwards) in the circumferential direction of the stator core. Correspondingly, the slot outer end portions at the second layer (that is, the first slot outer end portions of the second coil set 120) outside the stator core slots are bent and extended 3 slot pitches (i.e. 3d) in a same direction (leftwards) in the circumferential direction of the stator core. Correspondingly, the slot outer end portions at the third layer (that is, the second slot outer end portions of the second coil set 120) outside the stator core slots are bent and extended 3 slot pitches (i.e. 3d) in the same direction (rightwards) in the circumferential direction of the stator core. Correspondingly, the slot outer end portions at the fourth layer (that is, the first slot outer end portions of the second coil set 120) outside the stator core slots are bent and extended 3 slot pitches (i.e. 3d) in a same direction (leftwards) in the circumferential direction of the stator core. Correspondingly, the slot outer end portions at the fifth layer (that is, the second slot outer end portions of the second coil set 120) outside the stator core slots are bent and extended 3 slot pitches (i.e. 3d) in the same direction (rightwards) in the circumferential direction of the stator core. Correspondingly, the slot outer end portions at the sixth layer (that is, the slot outer end portions of the third coil set 130) outside the stator core slots are bent and extended 3 slot pitches (i.e. 3d) in the same direction (leftwards) in the circumferential direction of the stator core. Therefore, the three-phase stator winding is formed.

The U-phase winding, the V-phase winding, and the W-phase winding of the stator winding 10 adopt the star connection. Three branches U1, U2, and U3 of the U-phase winding are in parallel connection, three branches V1, V2, and V3 of the V-phase winding are in parallel connection, and three branches W1, W2, and W3 of the W-phase winding are in parallel connection. Each of the branches is in serial connection. The V-phase winding, the W-phase winding, and the U-phase winding are same in connection, which will not be described in detail herein.

In some embodiment, terminals of the three branches U1, U2, and U3 in the U-phase winding of the three-phase stator winding are connect with three slot outer end portions 21031 of the U-phase winding at any layer in any slot. The neutral points are connect with the slot outer end portions 21031 radially adjacent to the slot outer end portions 21031 connected with the terminals of the three branches U1, U2, and U3 in the U-phase winding. In this embodiment, the terminals of the three branches U1, U2, and U3 in the U-phase winding are connected with three slot outer end portions 21031 of adjacent slots at the second layer of the stator core. The neutral points of the three branches U1, U2, and U3 in the U-phase winding are connected with three slot outer end portions 21031 that are radially adjacent to the slot outer end portions 21031 connected with the terminals and at the first layer of the stator core. Two slot outer end portions that are adjacent in the same radial direction of the stator core are of the remaining slot outer end portions connected to each other. Therefore, the stator winding in this embodiment is formed. In this embodiment, the positional relationship of the slot outer end portions connected with the U-phase terminals and the neutral points can be interchanged. There is no loop current in the parallel branches. Since the branches are completely symmetrical in structure, there is no loop current.

Figure 15:
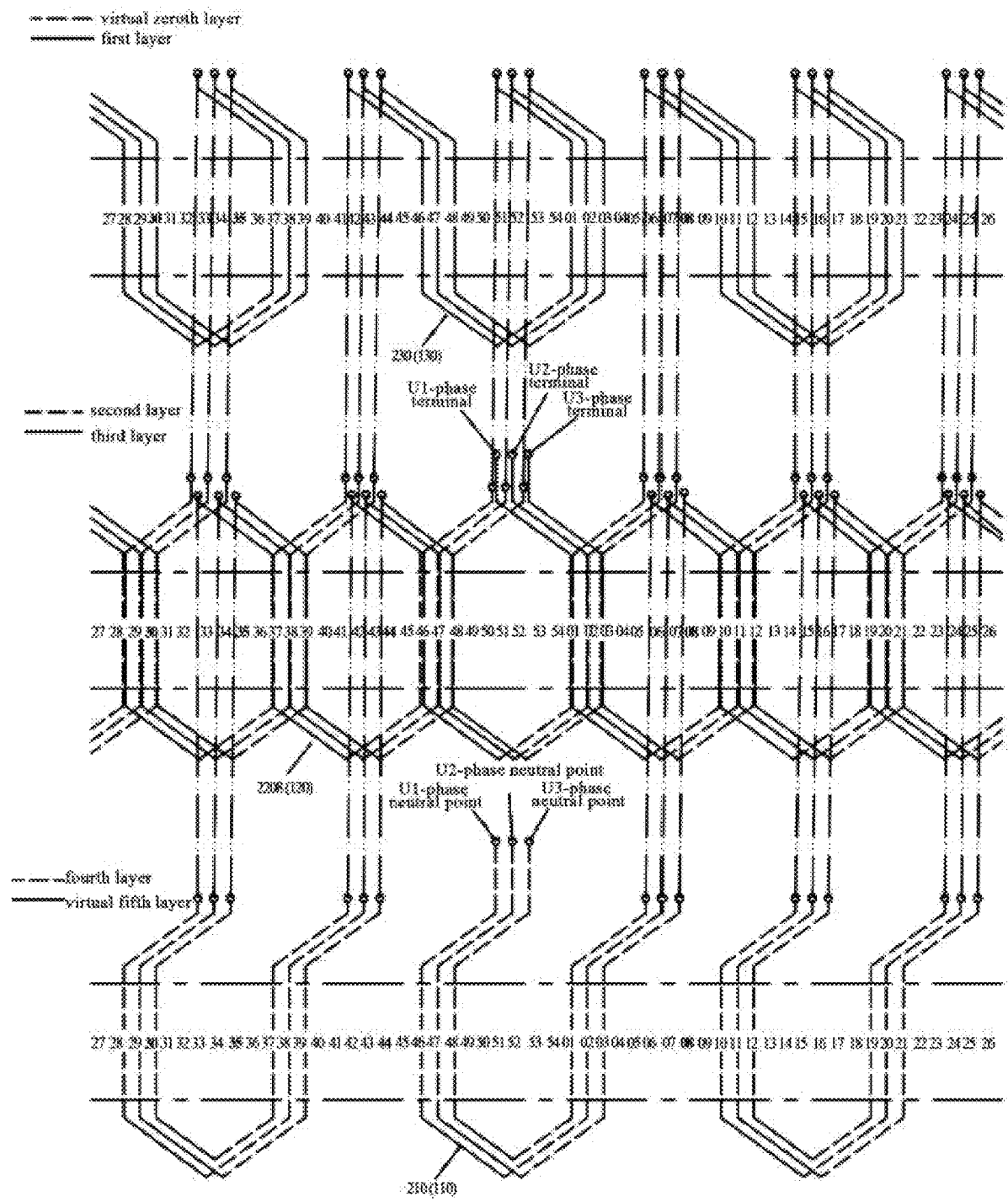
FIG. 15 is a planar expanded schematic diagram of a winding of one-phase in a stator winding of another electric motor stator according to an embodiment of the present disclosure.

The present disclosure further provides an embodiment. As shown in FIG. 15, in this embodiment, a stator winding 10 adopts a first coil set 110, a second coil set 120 (220B), and a third coil set 130. A U-phase winding, a V-phase winding, and a W-phase winding of the stator winding 10 adopts star connection. As shown in FIG. 15, three branches U1, U2, and U3 of the U-phase winding are in parallel connection, three branches V1, V2, and V3 of the V-phase winding are in parallel connection, and three branches W1, W2, and W3 of the W-phase winding are in parallel connection. Each of the branches is in serial connection. The V-phase winding, the W-phase winding, and the U-phase winding are same in connection, which will not be described in detail herein. In this embodiment, the positional relationship of the slot outer end portions connected with the U-phase terminals and the neutral points can be interchanged. There is no loop current in the parallel branches. Since the branches are completely symmetrical in structure, there is no loop current.

Figure 13:
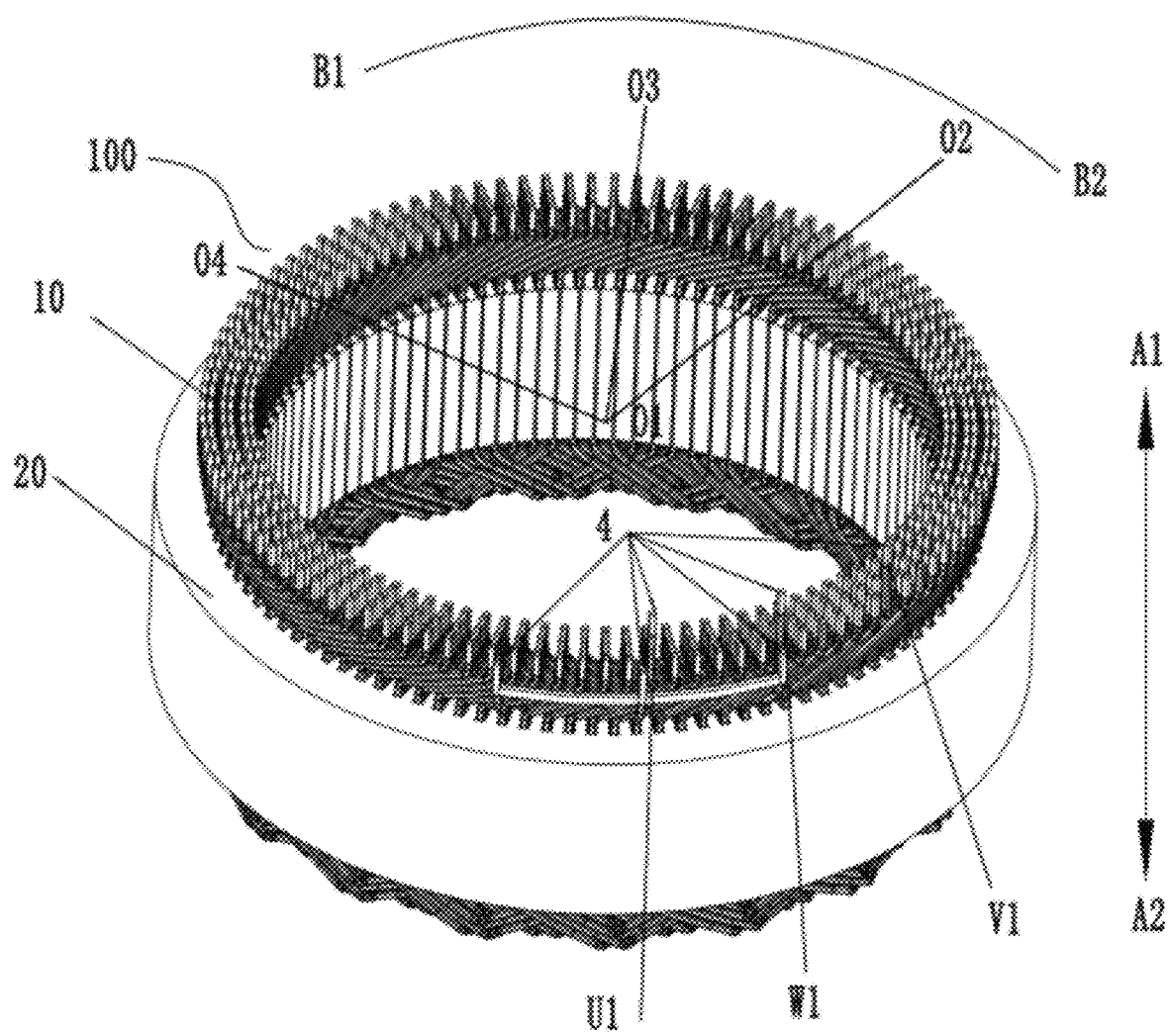
FIG. 13 is a schematic structural diagram of another electric motor stator according to an embodiment of the present disclosure.

The present disclosure further provides an embodiment. As shown in FIG. 13, a U1-phase winding, a V1-phase winding, and a W1-phase winding of a stator winding 10 adopt star connection. Three branches U11, U12, and U13 of the U1-phase winding are in serial connection. Each of the branches is in serial connection. The V1-phase winding, the W1-phase winding, and the U1-phase winding are same in connection, which will not be described in detail herein. Therefore, three phases U, V, and W of the stator winding 10 are formed. Due to few types of coil unit and a simple arrangement mode, the use of the bus strips and the bus bars are reduced, so that the terminals and the neutral points of the branches of each phase winding can be disposed in any slot and any layer, thereby lowering a degree of complexity of the manufacturing technique, reducing the production cost and increasing the processing efficiency.

Figure 14:
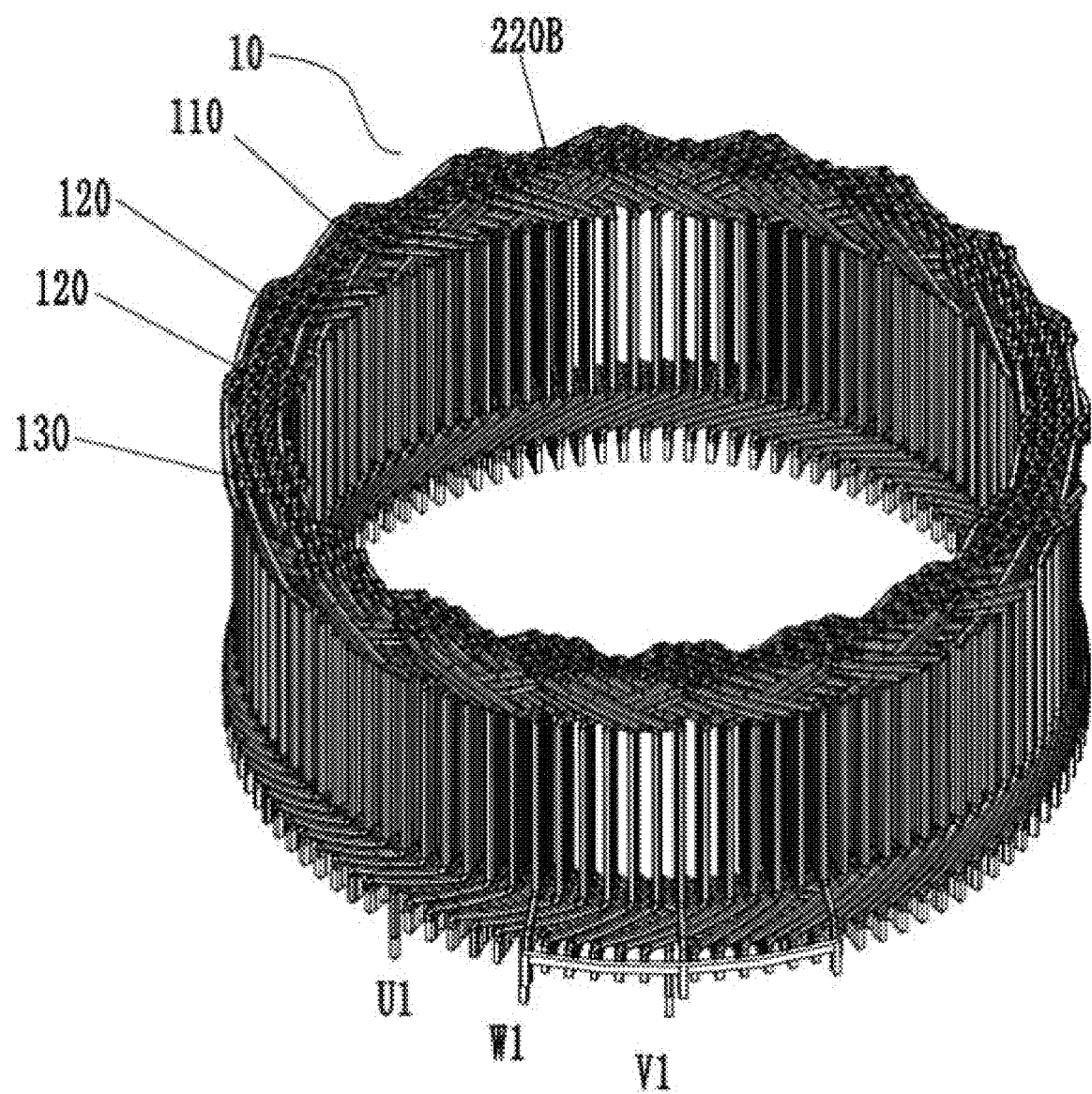
FIG. 14 is a schematic structural diagram of a stator winding of another electric motor stator according to an embodiment of the present disclosure.

The present disclosure further provides an embodiment. As shown in FIG. 14, a U1-phase winding, a V1-phase winding, and a W1-phase winding of a stator winding 10 adopt star connection. Three branches U11, U12, and U13 of the U1-phase winding are in serial connection. Each of the branches is in serial connection. The V-phase winding, the W-phase winding, and the U-phase winding are same in connection, which will not be described in detail herein. Therefore, three phases U1, V1, and W1 of the stator winding 10 are formed. Due to few types of coil unit and a simple arrangement mode, the use of the bus strips and the bus bars can be reduced, so that the terminals and neutral points of the branches of each phase winding can be disposed in any slot and any layer, thereby lowering a degree of complexity of the manufacturing technique, reducing the production cost and increasing the processing efficiency.

A difference between the embodiments shown in FIG. 13 and FIG. 14 lies in that, the second coil sets 120 in the middle of the stator winding are different. The second coil set 120 in the middle of the stator winding in FIG. 13 adopts two second segmented coil units 220A, while the second coil set 120 in the middle of the stator winding in FIG. 14 adopts two second segmented coil units 220B.

Figure 16:
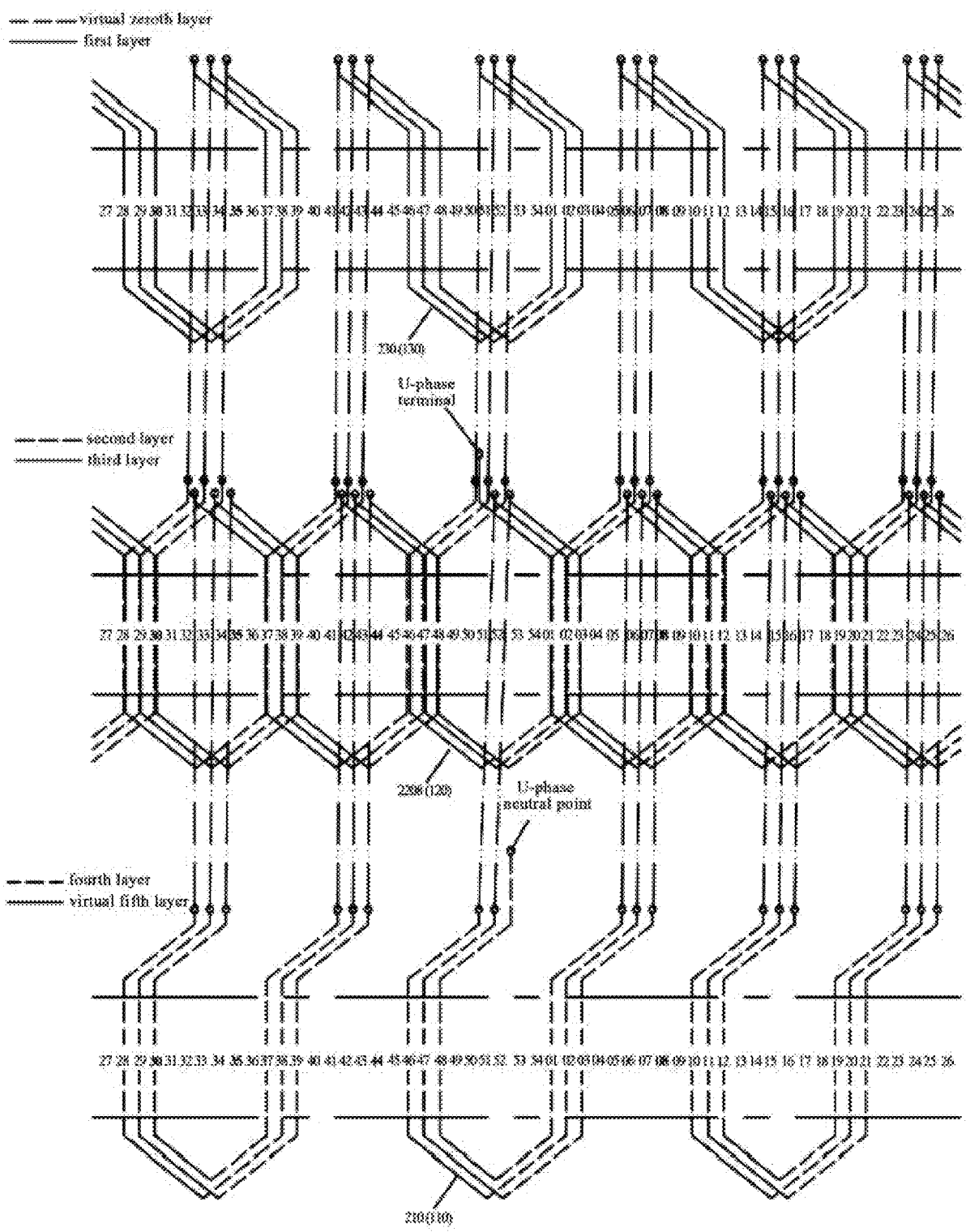
FIG. 16 is a planar expanded schematic diagram of a winding of one-phase in a stator winding of another electric motor stator according to an embodiment of the present disclosure.

The present disclosure further provides an embodiment. As shown in FIG. 16, in this embodiment, a stator winding 10 adopts a first coil set 110, a second coil set 120 (220B), and a third coil set 130. A U-phase winding, a V-phase winding, and a W-phase winding of the stator winding 10 adopt star connection. As shown in FIG. 15, three branches U1, U2, and U3 of the U-phase winding are in serial connection. Each of the branches is in serial connection. The V-phase winding, the W-phase winding, and the U-phase winding are same in connection, which will not be described in detail herein. Due to few types of coil unit and a simple arrangement mode, the use of the bus strips and the bus bars can be reduced, so that the terminals and the neutral points of the branches of each phase winding can be disposed in any slot and any layer, thereby lowering a degree of complexity of the manufacturing technique, reducing the production cost and increasing the processing efficiency.

An embodiment of the present disclosure further provides an electric motor. The electric motor includes a radial inner surface of a stator core and the electric motor stator in any of the above embodiments.

The electric motor provided in the embodiment of the present disclosure includes the electric motor stator in the above embodiments. Therefore, the electric motor provided in the embodiment of the present disclosure also has the beneficial effects described in the above embodiments, which will not be described in detail herein.

In the description of the embodiments of the present disclosure, unless otherwise clearly specified and limited, the terms "mounted", "connected" and "connect" should be interpreted broadly. For example, the term "connect" may be fixed connection, detachable connection or integral construction. As an alternative, the term "connect" may be mechanical connection, or electrical connection. As an alternative, the term "connect" may be direct connection, or indirect connection through a medium, or communication in two elements. For those of ordinary skill in the art, specific meanings of the above mentioned terms in the present disclosure may be understood according to a specific condition.

It is to be finally noted that, the above is merely preferred embodiments and the used technical principles of the present disclosure. Those skilled in the art will understand that, the present disclosure is not limited to the specific embodiments described herein, and various obvious changes, readjustments and substitutions can be made by those skilled in the art without departing from the scope of protection of the present disclosure. Therefore, although the present disclosure is described in more detail through the above embodiments, the present disclosure is not limited to the above embodiments, and can also include more other equivalent embodiments without departing from the concept of the present disclosure. The scope of the present disclosure is determined by the scope of the appended claims.

What is claimed is:

1. An electric motor stator, comprising:
a stator core, being provided with a plurality of stator core slots, wherein the plurality of stator core slots are formed on a radial inner surface of the stator core and are separated by a preset slot distance in a circumferential direction of the stator core; and
a stator winding, mounted on the stator core, wherein
the stator winding is provided with Q pole pair coils, wherein Q/a number of slots per pole per phase=P, P being an integer; wherein the stator winding is a three-phase winding, and the number of slots per pole per phase is 3; and
the stator winding comprises a first coil set and a third coil set that are successively sleeved from outside to inside, wherein
the first coil set comprises a plurality of first segmented coil units, and any one of the plurality of first segmented coil units is provided with two hair-pin coils with different pitches;
the plurality of first segmented coil units of the first coil set are successively arranged at a same layer in the stator core slots in the circumferential direction of the stator core;
the third coil set comprises a plurality of third segmented coil units, and any one of the plurality of third segmented coil units is provided with hair-pin coils with a same pitch;
the plurality of third segmented coil units of the third coil set are successively arranged at a same layer in the stator core slots in the circumferential direction of the stator core; and
the pitches of the hair-pin coils in each first segmented coil unit are different from the pitches of the hair-pin coils in each third segmented coil unit;
the stator winding further comprises a second coil set disposed between the first coil set and the third coil set, wherein the second coil set comprises a plurality of second segmented coil units, any one of the plurality of second segmented coil units is provided with two hair-pin coils with different pitches, or, any one of the plurality of second segmented coil units is provided with hair-pin coils with a same pitch; and
the plurality of second segmented coil units of the second coil set are successively arranged at adjacent two layers in the stator core slots in the circumferential direction of the stator core;

each first segmented coil unit comprises one long-pitch hair-pin coil and two short-pitch hair-pin coils, or, each first segmented coil unit comprises two long-pitch hair-pin coils and one short-pitch hair-pin coil.

2. The electric motor stator as claimed in claim 1, wherein the pitches of the hair-pin coils of each second segmented coil unit are the same as the pitches of the hair-pin coils of each first segmented coil unit.

3. The electric motor stator as claimed in claim 1, wherein the pitches of the hair-pin coils of each second segmented coil unit are the same as the pitches of the hair-pin coils of each third segmented coil unit.

4. The electric motor stator as claimed in claim 1, wherein each third segmented coil unit comprises a hair-pin coil with a diameter pitch.

5. The electric motor stator as claimed in claim 1, wherein each hair-pin coil of each segmented coil unit in each coil set of the stator winding comprises a first slot outer end portion, a first slot inner portion, a first slot outer turning portion, a second slot inner portion, and a second slot outer end portion that are successively connected, wherein the first slot inner portion and the second slot inner portion are located in different slots, the first slot outer turning portion of each hair-pin coil of each segmented coil unit in each coil set of the stator winding is located on a side of an end surface of the stator core, and the first slot outer end portion or the second slot outer end portion of each hair-pin coil of each segmented coil unit in each coil set of the stator winding is located on a side of the other end surface of the stator core.

6. The electric motor stator as claimed in claim 5, wherein the first slot outer end portion and the second slot outer end portion of each hair-pin coil of each segmented coil unit of the first coil set have a same extending direction in the circumferential direction of the stator core, the first slot outer end portion and the second slot outer end portion of each hair-pin coil of each segmented coil unit of the third coil set have a same extending direction in the circumferential direction of the stator core, and the first slot outer end portion of each hair-pin coil of each segmented coil unit of the first coil set and the first slot outer end portion of each hair-pin coil of each segmented coil unit of the third coil set have opposite extending directions in the circumferential direction of the stator core.

7. The electric motor stator as claimed in claim 5, wherein a slot inner portion of each hair-pin coil of each segmented coil unit of the stator winding and a slot outer end portion connected with the slot inner portion and extended in the circumferential direction are located at a same layer of the stator core.

8. The electric motor stator as claimed in claim 7, wherein each slot outer end portion of each hair-pin coil of each segmented coil unit in each coil set of the stator winding and a slot outer end portion radially adjacent to the each slot outer end portion extend in opposite directions in the circumferential direction of the stator core.

9. The electric motor stator as claimed in claim 5, wherein the first slot outer end portion and the second slot outer end portion have extending ends, and except the extending ends connected with lead wires, an extending end of a N−1 layer and an extending end of a N layer in a same radial direction of the stator core are connected, the extending end of the N layer is adjacent to the extending end of the N−1 layer, wherein N is an even number.

10. An electric motor, comprising a rotor and the electric motor stator as claimed in claim 1.

11. The electric motor as claimed in claim 10, wherein the pitches of the hair-pin coils of each second segmented coil unit are the same as the pitches of the hair-pin coils of each first segmented coil unit.

12. The electric motor as claimed in claim 10, wherein the pitches of the hair-pin coils of each second segmented coil unit are the same as the pitches of the hair-pin coils of each third segmented coil unit.

13. The electric motor as claimed in claim 10, wherein each third segmented coil unit comprises a hair-pin coil with a diameter pitch.

* * * * *